(12) United States Patent
Yamada et al.

(10) Patent No.: US 8,654,778 B2
(45) Date of Patent: Feb. 18, 2014

(54) SLEEP-MODE CONTROL INFORMATION PROCESSING DEVICE, STORAGE MEDIUM AND SLEEP-MODE CONTROL METHOD

(75) Inventors: Akiko Yamada, Kawasaki (JP); Satoshi Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 284 days.

(21) Appl. No.: 12/820,301

(22) Filed: Jun. 22, 2010

(65) Prior Publication Data

US 2011/0002338 A1 Jan. 6, 2011

(30) Foreign Application Priority Data

Jul. 3, 2009 (JP) ................. 2009-159266

(51) Int. Cl.
*H04L 12/56* (2011.01)
(52) U.S. Cl.
USPC ............ 370/400; 370/311; 370/318; 455/574
(58) Field of Classification Search
USPC ............................ 370/311, 318, 400; 455/574
See application file for complete search history.

(56) References Cited

U.S. PATENT DOCUMENTS

| | | | |
|---|---|---|---|
| 6,604,201 | B1 | 8/2003 | Takahashi et al. |
| 2005/0215234 | A1 | 9/2005 | Fukuzawa et al. |
| 2007/0211654 | A1 | 9/2007 | Kim et al. |
| 2008/0186984 | A1* | 8/2008 | Nakano ........................ 370/400 |

FOREIGN PATENT DOCUMENTS

| | | |
|---|---|---|
| JP | 2000-201166 | 7/2000 |
| JP | 2000-261515 | 9/2000 |
| JP | 2005-184285 | 7/2005 |
| JP | 2005-278044 | 10/2005 |
| JP | 2008-131173 | 6/2008 |
| WO | 2009/051458 | 4/2009 |

OTHER PUBLICATIONS

Notice of Rejection Grounds dated Mar. 26, 2013, from corresponding Japanese Application No. 2009-159266.

* cited by examiner

*Primary Examiner* — Dang T Ton
*Assistant Examiner* — Mewale Ambaye
(74) *Attorney, Agent, or Firm* — Katten Muchin Rosenman LLP

(57) ABSTRACT

An information processing device, comprising: a traffic control unit configured to regularly check whether packets are transmitted to an adjacent node and received from the adjacent node; and a sleep determination process unit configured to determine whether there is a possibility that packets are transmitted to the adjacent node when no packet is transmitted to the adjacent node and received from to the adjacent node, and to transmit a sleep OK notice to the adjacent node indicating that the adjacent node shift to a sleep mode when the sleep determination process unit determines that there is a low probability that packets are transmitted to the adjacent node.

9 Claims, 59 Drawing Sheets

| IF (INTERFACE) NO. | CONNECTION (NEXT HOP) | ADJACENT NODE status | MESSAGE TRANSMISSION status | MESSAGE TRANSMISSION TIME |
|---|---|---|---|---|
| IF1 | NODE 102 | OPERATING | — | — |
| IF2 | NODE 105 | SLEEPING | sleep OK MESSAGE NOTICE | 20 : 02 : 11 |

F I G. 3

|   | CONDITION | OPERATION |
|---|---|---|
| 1 | THE UTILIZATION RATE OF A PRIMARY ROUTE EXCEEDS 70%. | USE A SECONDARY ROUTE. |
| 2 | THE UTILIZATION RATE OF A PRIMARY ROUTE EXCEEDS 60%. | DETERMINE THAT THERE IS A HIGH PROBABILITY THAT A SECONDARY ROUTE MAY BE USED. |
| 3 | AFTER CONDITION 2 IS MET, THE UTILIZATION RATE OF A PRIMARY ROUTE FALLS BELOW 50%. | DETERMINE THAT THERE IS A NOT HIGH PROBABILITY THAT A SECONDARY ROUTE MAY BE USED. |

FIG. 4

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 2 | 100Mbps | 40Mbps | 40% | 62Mbps | 62% |
| IF2 | NODE 3 | 100Mbps | 0Mbps | 0% | 0Mbps | 0% |

FIG. 5

| DESTINATION | IF (INTERFACE) NO. | CONNECTION (NEXT HOP) | ROUTE | TYPE | TRANSFER PROBABILITY |
|---|---|---|---|---|---|
| NW1 | IF1 | NODE 2 | 1→2→NW1 | PRIMARY ROUTE | 100% |
| | IF2 | NODE 3 | 1→3→2→NW1 | SECONDARY ROUTE | 0% |
| NW2 | IF3 | NODE 4 | 1→4→NW2 | PRIMARY ROUTE | 65% |
| | IF4 | NODE 5 | 1→5→NW2 | SECONDARY ROUTE | 35% |

FIG. 6

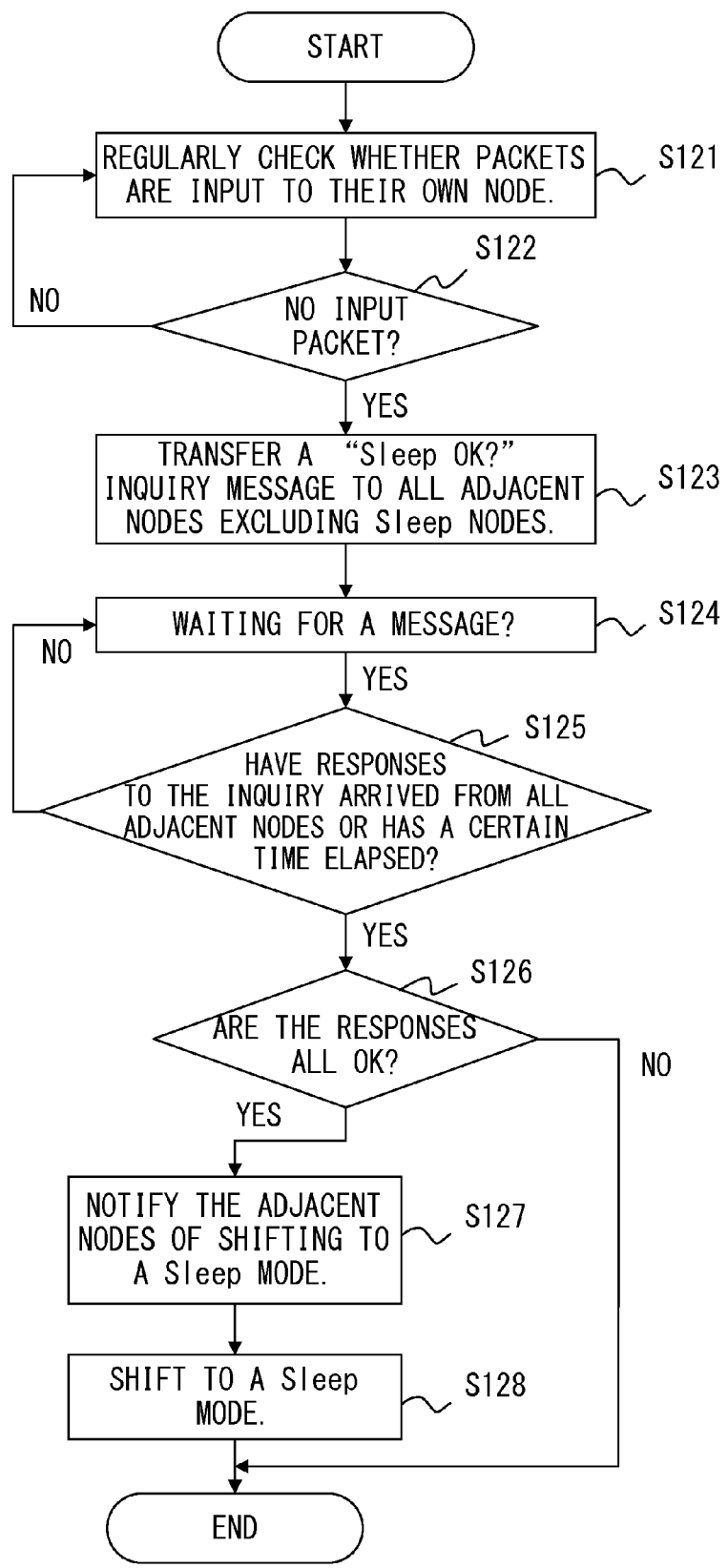
F I G. 7

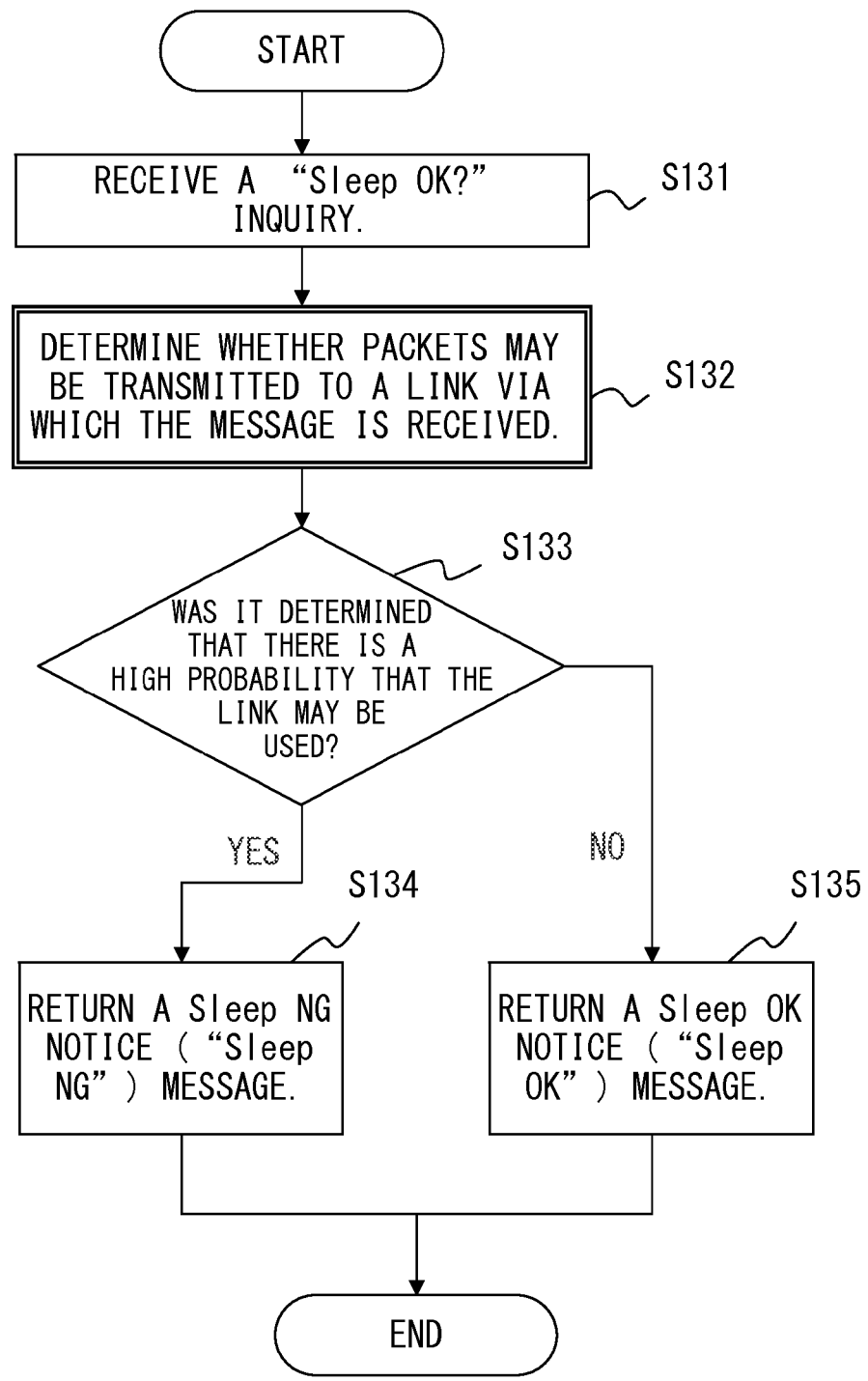
F I G. 8

| DESTINATION | IF (INTERFACE) NO. | CONNECTION (NEXT HOP) | ROUTE | TYPE | TRANSFER PROBABILITY |
|---|---|---|---|---|---|
| NW155 | IF1 | NODE 152 | 151→152→NW155 | PRIMARY ROUTE | 100% |
| | IF2 | NODE 153 | 151→153→152→NW155 | SECONDARY ROUTE | 0% |

F I G. 1 2

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 152 | 100Mbps | 40Mbps | 40% | 62Mbps | 62% |
| IF2 | NODE 153 | 100Mbps | 0Mbps | 0% | 0Mbps | 0% |

F I G. 1 3

| DESTINATION | IF (INTERFACE) NO. | CONNECTION (NEXT HOP) | ROUTE | TYPE | TRANSFER PROBABILITY |
|---|---|---|---|---|---|
| NODE 173 | IF1 | NODE 172 | ROUTE 1 (171→172→173) | PRIMARY ROUTE | 100% |
|  | IF2 | NODE 174 | ROUTE 2 (171→174→173) | SECONDARY ROUTE | 0% |

F I G. 1 5

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 172 | 100Mbps | 40Mbps | 40% | 0Mbps | 0% |
| IF2 | NODE 172 | 100Mbps | 0Mbps | 0% | 0Mbps | 0% |

F I G. 1 6

|   | CONDITION | OPERATION |
|---|---|---|
| 1 | THE UTILIZATION RATE OF A PRIMARY ROUTE EXCEEDS 70%. | USE A SECONDARY ROUTE. |
| 2 | THE UTILIZATION RATE OF A PRIMARY ROUTE EXCEEDS 60%. | DETERMINE THAT THERE IS A HIGH PROBABILITY THAT A SECONDARY ROUTE MAY BE USED. |
| 3 | AFTER CONDITION 2 IS MET, THE UTILIZATION RATE OF A PRIMARY ROUTE FALLS BELOW 50%. | DETERMINE THAT THERE IS A NOT HIGH PROBABILITY THAT A SECONDARY ROUTE MAY BE USED. |

F I G. 1 7

| DESTINATION | IF (INTERFACE) NO. | CONNECTION (NEXT HOP) | ROUTE | TYPE | TRANSFER PROBABILITY |
|---|---|---|---|---|---|
| NODE 173 | IF1 | NODE 176 | ROUTE 3 (175→176→173) | PRIMARY ROUTE | 100% |
| | IF2 | NODE 174 | ROUTE 4 (175→174→173) | SECONDARY ROUTE | 0% |

F I G. 1 8

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 176 | 100Mbps | 10Mbps | 10% | 0Mbps | 0% |
| IF2 | NODE 174 | 100Mbps | 0Mbps | 0% | 0Mbps | 0% |

FIG. 19

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 171 | 100Mbps | 0Mbps | 0% | 0Mbps | 0% |
| IF2 | NODE 172 | 100Mbps | 0Mbps | 0% | 0Mbps | 0% |
| IF3 | NODE 173 | 100Mbps | 0Mbps | 0% | 0Mbps | 0% |
| IF4 | NODE 175 | 100Mbps | 0Mbps | 0% | 0Mbps | 0% |

FIG. 20

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 172 | 100Mbps | 61Mbps | 61% | 0Mbps | 0% |
| IF2 | NODE 174 | 100Mbps | 0Mbps | 0% | 0Mbps | 0% |

FIG. 21

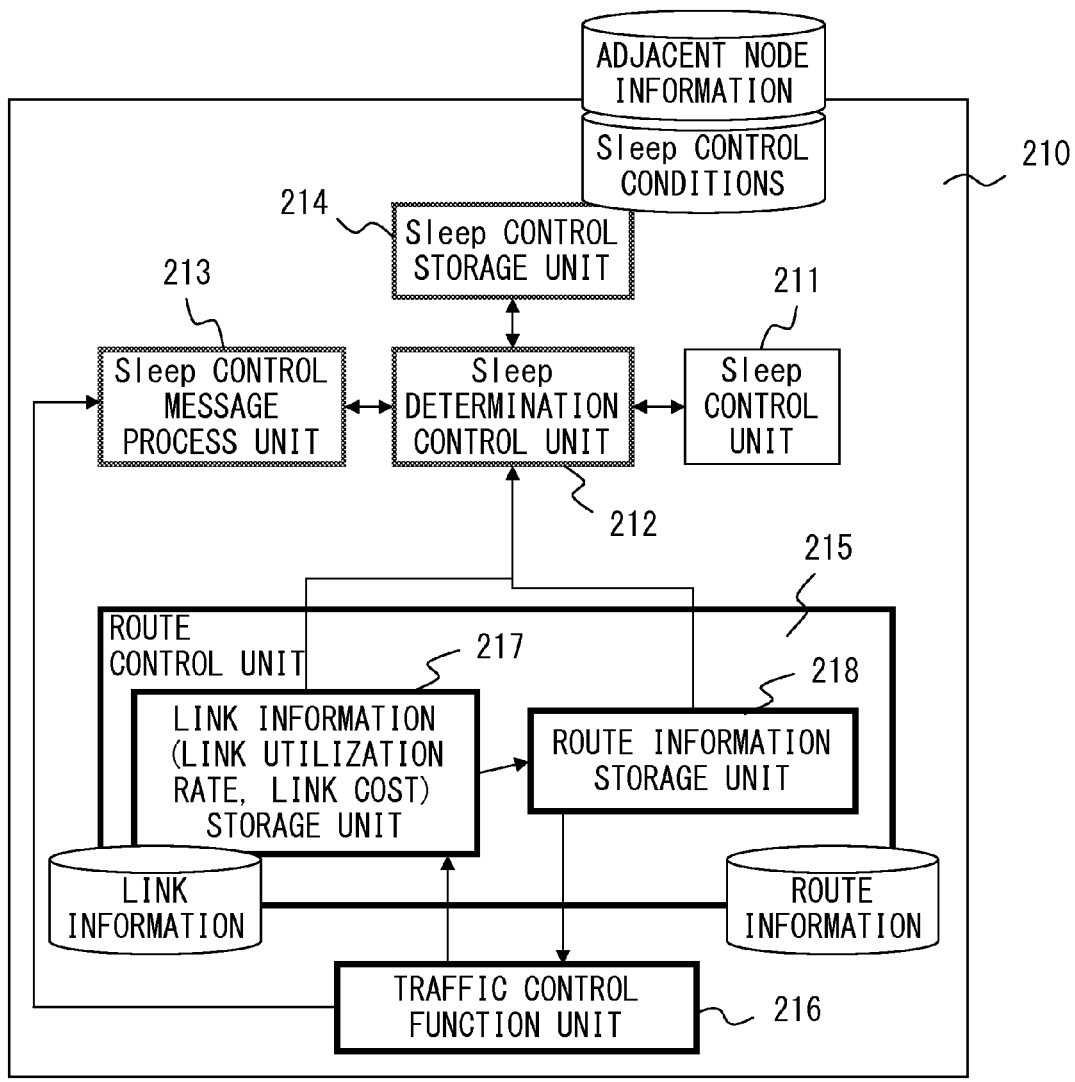
F I G. 2 4

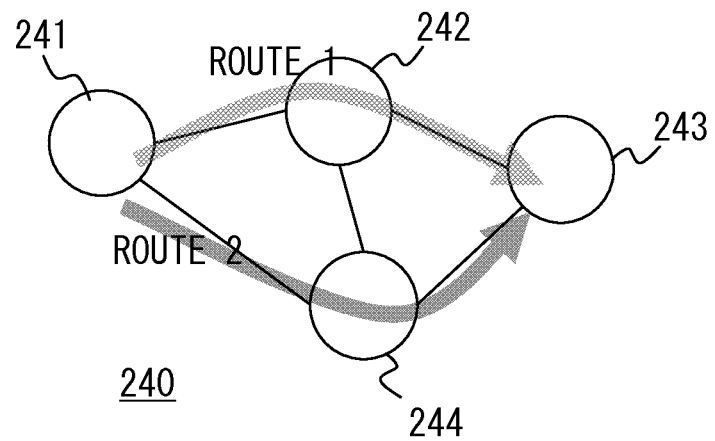
F I G. 2 7

| DESTINATION | IF (INTERFACE) NO. | CONNECTION (NEXT HOP) | ROUTE | TYPE | TRANSFER PROBABILITY |
|---|---|---|---|---|---|
| NODE 243 | IF1 | NODE 242 | ROUTE 1 (241→242→243) | PRIMARY ROUTE | 100% |
| | IF2 | NODE 244 | ROUTE 2 (241→244→243) | SECONDARY ROUTE | 0% |

F I G. 2 8

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 242 | 100Mbps | 40Mbps | 40% | 0Mbps | 0% |
| IF2 | NODE 244 | 100Mbps | 0Mbps | 0% | 0Mbps | 0% |

FIG. 29

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 241 | 100Mbps | 0Mbps | 0% | 40Mbps | 40% |
| IF2 | NODE 243 | 100Mbps | 40Mbps | 40% | 0Mbps | 0% |
| IF3 | NODE 244 | 100Mbps | 0Mbps | 0% | 0Mbps | 0% |

F I G. 3 0

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 242 | 100Mbps | 0Mbps | 0% | 40Mbps | 40% |
| IF2 | NODE 244 | 100Mbps | 0Mbps | 0% | 0Mbps | 0% |

F I G. 3 1

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 241 | 100Mbps | 0Mbps | 0% | 0Mbps | 0% |
| IF2 | NODE 242 | 100Mbps | 0Mbps | 0% | 0Mbps | 0% |
| IF3 | NODE 243 | 100Mbps | 0Mbps | 0% | 0Mbps | 0% |

F I G. 3 2

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 242 | 100Mbps | 61Mbps | 61% | 0Mbps | 0% |
| IF2 | NODE 244 | 100Mbps | 0Mbps | 0% | 0Mbps | 0% |

F I G. 3 3

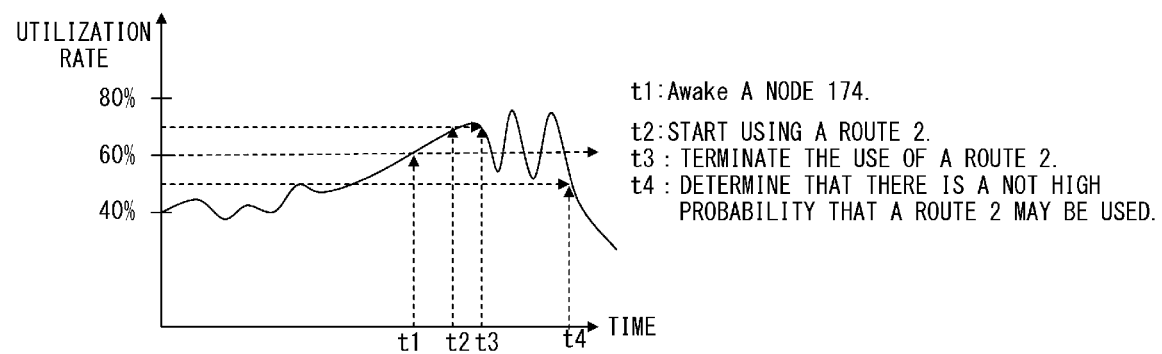
F I G. 3 4

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 242 | 100Mbps | 49Mbps | 49% | 0Mbps | 0% |
| IF2 | NODE 244 | 100Mbps | 0Mbps | 0% | 0Mbps | 0% |

F I G. 3 5

|  | CONDITION | OPERATION |
|---|---|---|
| 1 | THE UTILIZATION RATE OF A PRIMARY ROUTE EXCEEDS 70%. | USE A SECONDARY ROUTE. |
| 2 | THE UTILIZATION RATE OF A PRIMARY ROUTE EXCEEDS 60%. | DETERMINE THAT THERE IS A HIGH PROBABILITY THAT A SECONDARY ROUTE MAY BE USED. |
| 3 | THE UTILIZATION RATE 1 MINUTE AGO OF A PRIMARY ROUTE IS 20% OR MORE AND THE INCREASE RATE PER MINUTE OF THE UTILIZATION RATE EXCEEDS DOUBLE. | DETERMINE THAT THERE IS A HIGH PROBABILITY THAT A SECONDARY ROUTE MAY BE USED. |
| 4 | BETWEEN 12:00 AND 13:00 ON WEEKDAYS | DETERMINE THAT THERE IS A HIGH PROBABILITY THAT A SECONDARY ROUTE MAY BE USED. |
| 5 | AFTER CONDITIONS 2 AND 3 ARE MET, THE UTILIZATION RATE OF A PRIMARY ROUTE FALLS BELOW 50%. | DETERMINE THAT THERE IS A NOT HIGH PROBABILITY THAT A SECONDARY ROUTE MAY BE USED. |

F I G. 3 6

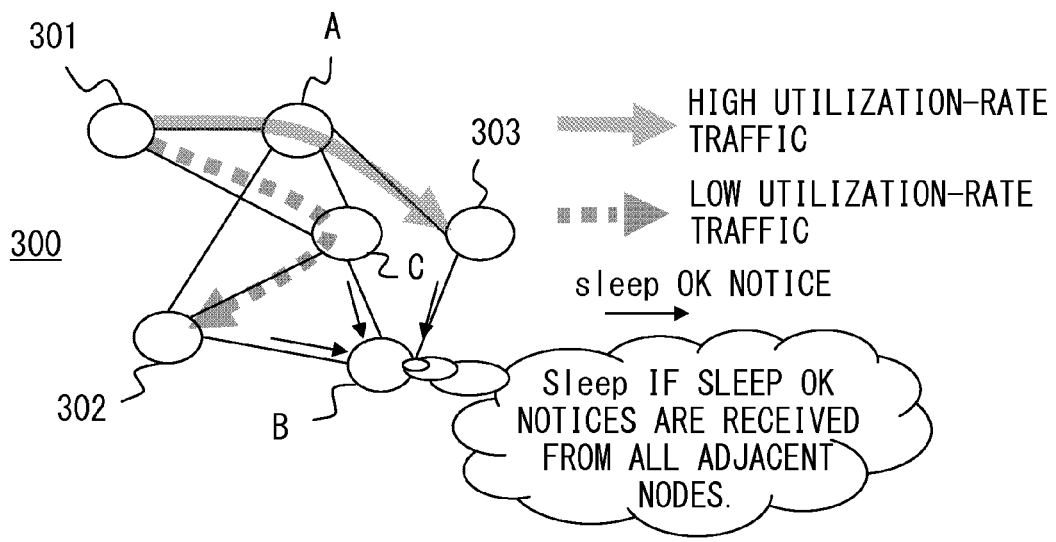
THE UTILIZATION RATE OF A ROUTE 301→C→302 IS LOW.
THE UTILIZATION RATE OF A ROUTE 301→A→303 IS HIGH.
F I G. 3 8

THE UTILIZATION RATE OF THE ROUTE 301→A→303 FURTHER
INCREASES AND A NEW ROUTE 301→A→C→B→303 STARTS BEING USED.

THE ADJACENT NODE OF NODE B COULD NOT BECOME AWARE OF A
POSSIBILITY THAT A NEW ROUTE MAY BE USED.

A NODE THAT HAS RECEIVED A TRANSMISSION ADVANCE-NOTICE MESSAGE TRANSFERS THE TRANSMISSION ADVANCE-NOTICE MESSAGE TO A SUBSEQUENT NODE.

THE NODE B THAT HAS RECEIVED THE TRANSMISSION ADVANCE-NOTICE DOES NOT SLEEP.

WHEN A SUBSEQUENT NODE IN A Sleep MODE ISSUES AN "AWAKE" INSTRUCTION AND TRANSFERS A TRANSMISSION ADVANCE-NOTICE MESSAGE.
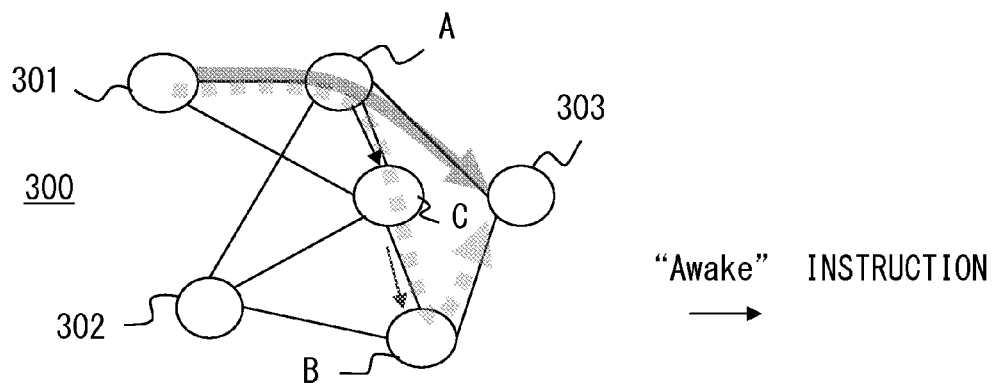
"Awake" INSTRUCTION
⟶
A NODE B IS Awoken BEFORE PACKETS ACTUALLY ARRIVE.
F I G. 4 1

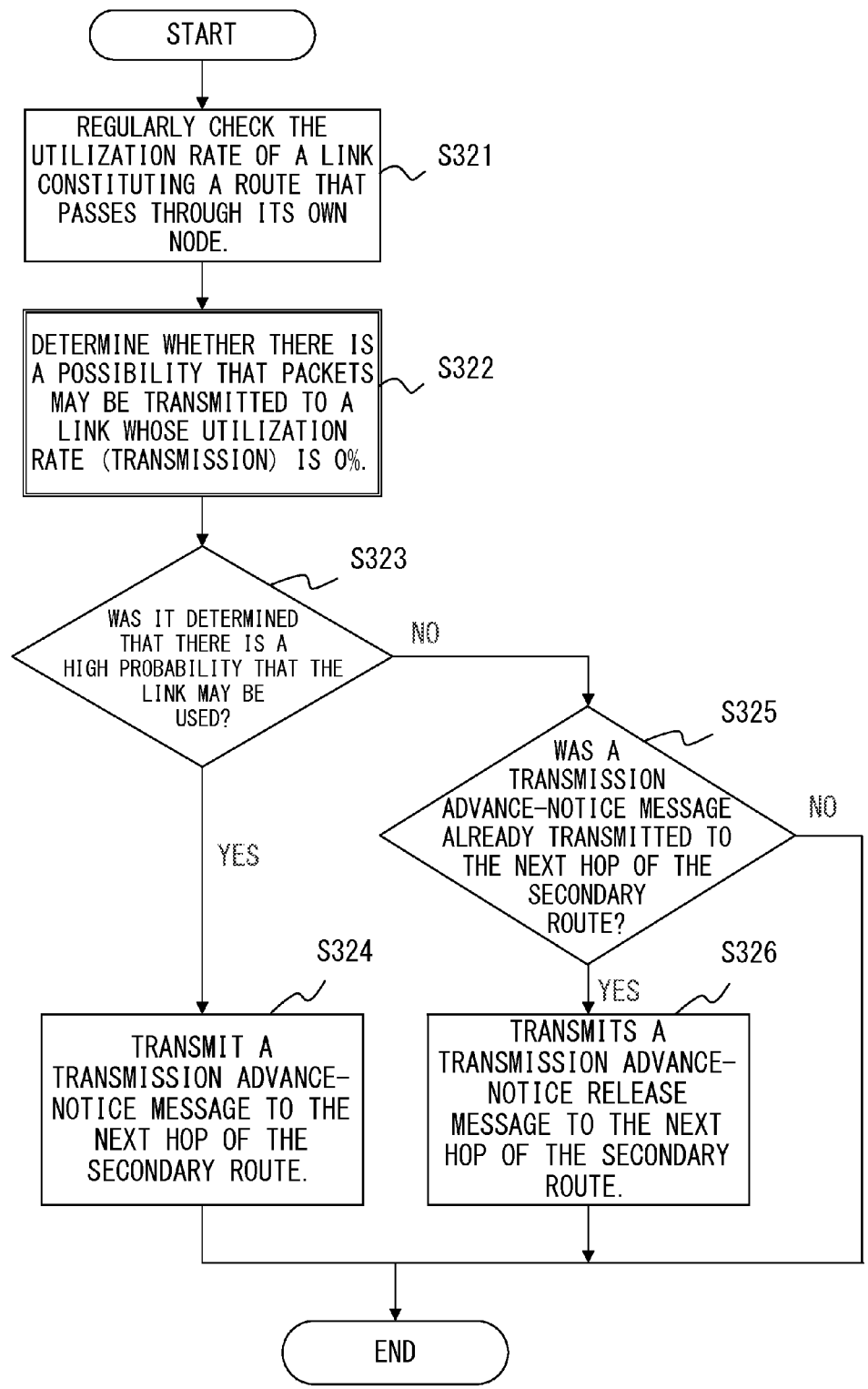
F I G. 4 3

|   | CONDITION | OPERATION |
|---|---|---|
| 1 | THE UTILIZATION RATE OF A PRIMARY ROUTE EXCEEDS 70%. | USE A SECONDARY ROUTE. |
| 2 | THE UTILIZATION RATE OF A PRIMARY ROUTE EXCEEDS 60%. | DETERMINE THAT THERE IS A HIGH PROBABILITY THAT A SECONDARY ROUTE MAY BE USED. |
| 3 | AFTER CONDITION 2 IS MET, THE UTILIZATION RATE OF A PRIMARY ROUTE FALLS BELOW 50%. | DETERMINE THAT THERE IS A NOT HIGH PROBABILITY THAT A SECONDARY ROUTE MAY BE USED. |

FIG. 46

| DESTINATION | IF (INTERFACE) NO. | CONNECTION (NEXT HOP) | ROUTE | TYPE | TRANSFER PROBABILITY |
|---|---|---|---|---|---|
| NODE 343 | IF1 | NODE 345 | ROUTE 1 (341→345→343) | PRIMARY ROUTE | 100% |
| | IF2 | NODE 342 | ROUTE 2 (341→342→344→343) | SECONDARY ROUTE | 0% |

F I G. 4 7

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 345 | 100Mbps | 40Mbps | 40% | 0Mbps | 0% |
| IF2 | NODE 342 | 100Mbps | 0Mbps | 0% | 10Mbps | 10% |

F I G. 4 8

| DESTINATION | IF (INTERFACE) NO. | CONNECTION (NEXT HOP) | ROUTE | TYPE | TRANSFER PROBABILITY |
|---|---|---|---|---|---|
| 3 | IF1 | NODE 345 | ROUTE 3 (346→342→341) | PRIMARY ROUTE | 100% |
|   | IF2 | NODE 342 | ROUTE 4 (346→345→341) | SECONDARY ROUTE | 0% |

F I G. 4 9

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 342 | 100Mbps | 10Mbps | 10% | 0Mbps | 0% |
| IF2 | NODE 345 | 100Mbps | 0Mbps | 0% | 0Mbps | 0% |

F I G. 5 0

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 342 | 100Mbps | 0Mbps | 0% | 0Mbps | 0% |
| IF2 | NODE 343 | 100Mbps | 0Mbps | 0% | 0Mbps | 0% |

F I G. 51

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 345 | 100Mbps | 61Mbps | 61% | 0Mbps | 0% |
| IF2 | NODE 342 | 100Mbps | 0Mbps | 0% | 10Mbps | 10% |

FIG. 52

| TRANSMITTING SOURCE=NODE 341 | DESTINATION= NODE 343 | ROUTE INFORMATION= 341→342→344→343 | MESSAGE TYPE= TRANSMISSION ADVANCE-NOTICE |
|---|---|---|---|

F I G. 5 3

| IF (INTERFACE) NO. | CONNECTION (NEXT HOP) | BANDWIDTH | TRANSMISSION RATE | UTILIZATION RATE (TRANSMISSION) | INFLUX RATE | UTILIZATION RATE (INFLUX) |
|---|---|---|---|---|---|---|
| IF1 | NODE 345 | 100Mbps | 49Mbps | 49% | 0Mbps | 0% |
| IF2 | NODE 342 | 100Mbps | 0Mbps | 0% | 10Mbps | 10% |

F I G. 5 4

| TRANSMITTING SOURCE=NODE 341 | DESTINATION= NODE 343 | ROUTE INFORMATION= 341→342→344→343 | MESSAGE TYPE= TRANSMISSION ADVANCE-NOTICE RELEASE |
|---|---|---|---|

F I G. 5 5

| DESTINATION | IF (INTERFACE) NO. | CONNECTION (NEXT HOP) | ROUTE | TYPE | TRANSFER PROBABILITY |
|---|---|---|---|---|---|
| NODE 343 | IF1 | NODE 344 | ROUTE 2 (342→344→343) | — (NO INFORMATION) | — |
| NODE 341 | IF2 | NODE 341 | ROUTE 3 (342→341) | — (NO INFORMATION) | — |

F I G. 5 6

| DESTINATION | IF (INTERFACE) NO. | CONNECTION (NEXT HOP) | ROUTE | TYPE | TRANSFER PROBABILITY |
|---|---|---|---|---|---|
| NODE 343 | IF1 | NODE 343 | ROUTE 2 (344→343) | — | — |

F I G. 5 7

| TRANSMITTING SOURCE=NODE 341 | DESTINATION=NODE 343 | ROUTE INFORMATION=ROUTE 2 | MESSAGE TYPE=TRANSMISSION ADVANCE-NOTICE |
|---|---|---|---|

FIG. 58

SLEEP-MODE CONTROL INFORMATION PROCESSING DEVICE, STORAGE MEDIUM AND SLEEP-MODE CONTROL METHOD

CROSS-REFERENCE TO RELATED APPLICATION

This application is based upon and claims the benefit of priority of the prior Japanese Patent Application No. 2009-159266, filed on Jul. 3, 2009, the entire contents of which are incorporated herein by reference.

FIELD

The embodiments discussed herein are related to a power-saving sleep-mode control information processing device, a storage medium on which a sleep-mode control program is recorded, and a sleep-mode control method in a network to which a plurality of information processing devices are connected.

BACKGROUND

The amount of traffic that passes through a network fluctuates and a node through which no packets pass will sometimes appear, depending on time zones. There currently exists a node which may operate in a sleep mode and which realizes power saving by operating only the minimum necessary functions and minimizing its power consumption in nodes through which no packets pass.

Among methods for controlling the sleep mode of a node there is one in which a server for collectively managing all of the traffic status in a network is provided and the collective management server instructs a specific node to shift and return to a sleep mode according to the traffic status.

A device capable of determining whether a certain device is in a sleep mode or its power is switched off by transmitting a packet to a network device that may be in a sleep mode from another device and monitoring its response packet is also known.

In a method using a conventional collective management server, it is necessary to dispose in a network a server having a function to collect traffic information, manage it, and make determinations on the basis of it. Such a method may not cope with network so large that it exceeds the process capability of a server. With such a method, it becomes necessary to modify its settings every time the topology of a network or the like is modified and thus management costs become high.

Even if a packet does not arrive for a short time when a node shifts to a sleep mode via a determination by the node that is based only on whether a packet has actually been input to it, sometimes the node shifts to a sleep mode and it becomes necessary to promptly awake (return from a sleep mode) when a packet arrives immediately after the node has begun sleeping. Thus, when a node shifts to a sleep mode via a determination by the node that is based only on whether a packets has actually been input to it, its mode is frequently switched over.

There is also a method of return from a sleep mode in which a node returns when a packet reaches a sleep node or its adjacent node enables a sleep node to be returned to when a packet reaches a node immediately before a sleep node. However, in this case, packet transfer is delayed by an amount of time necessary for it to return.

Patent document 1: Japanese Laid-open Patent Publication No. 2000-261515

SUMMARY

According to an aspect of the invention, an information processing device includes a traffic control unit configured to check whether a packet has been input to the information processing device, a sleep inquiry process unit configured to inquire of all adjacent nodes excluding a sleep node whether the information processing device may sleep when the traffic control unit has determined that no packet has been input, and a sleep determination unit configured to determining whether the information processing device should shift to a sleep mode on the basis of a response to the inquiry of the sleep inquiry process unit from an adjacent node.

According to an aspect of the invention, an information processing device includes a traffic control unit configured to regularly check whether a packet has been transmitted/received to/from an adjacent node and a sleep determination process unit configured to determine whether a packet may be transmitted to the adjacent node when no packet has been transmitted/received to/from an adjacent node, and transmit to the adjacent node a sleep OK notice indicating that the adjacent node may shift to a sleep mode when it is determined that there is a low probability that packets may be transmitted to the adjacent node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an example of an adjacent node information.

FIG. 4 illustrates an example of a sleep control condition.

FIG. 5 illustrates an example of link information.

FIG. 6 illustrates an example of route information.

FIG. 7 is a flowchart of a sleep-mode control process of a node according to the first preferred embodiment.

FIG. 8 is a flowchart of a response process to an inquiry about whether an adjacent node may be shifted to a sleep mode, according to the first preferred embodiment.

FIG. 12 illustrates the route information of a node 151.

FIG. 13 illustrates the link information of a node 151.

FIG. 15 illustrates the route information of a node 171.

FIG. 16 illustrates an example of the link information of a node 171.

FIG. 17 illustrates the sleep control conditions of a node 171.

FIG. 18 illustrates the route information of a node 175.

FIG. 19 illustrates the link information of a node 175.

FIG. 20 illustrates the link information of a node 174.

FIG. 21 illustrates another example of the link information of a node 171.

FIG. 24 is a configuration of a node according to the second preferred embodiment.

FIG. 27 is a network configuration of a detailed example according to the second preferred embodiment.

FIG. 28 illustrates the route information of anode 241.

FIG. 29 illustrates the link information of a node 241.

FIG. 30 illustrates the link information of a node 242.

FIG. 31 illustrates the link information of a node 243.

FIG. 32 illustrates the link information of a node 244.

FIG. 33 illustrates the link information of a node 241 at a time t1.

FIG. 34 is a graph indicating an example of the utilization rate of a node 241.

FIG. 35 illustrates the link information of a node 241 at a time t4.

FIG. 36 illustrates the sleep control conditions of a node 241.

FIG. 38 is an example of the case where frequent mode switchovers occur (No. 1).

FIG. 41 is the basic principle of a sleep-mode control method according to the third preferred embodiment (No. 2).

FIG. 43 is a flowchart of the transmission advance-notice message and transmission advance-notice release message generation process of a node according to the third preferred embodiment.

FIG. 46 illustrates the respective sleep control conditions of nodes 341-346.

FIG. 47 illustrates the route information of anode 341.

FIG. 48 illustrates an example of the link information of a node 341.

FIG. 49 illustrates the route information of anode 346.

FIG. 50 illustrates the link information of a node 346.

FIG. 51 illustrates the link information of a node 344.

FIG. 52 illustrates another example of the link information of a node 341.

FIG. 53 is the format of a transmission advance-notice message.

FIG. 54 illustrates another example of the link information of a node 341.

FIG. 55 is the format of a transmission advance-notice release message.

FIG. 56 illustrates the route information of anode 342.

FIG. 57 illustrates the route information of a node 344.

FIG. 58 is the format of a transmission advance-notice message.

DESCRIPTION OF EMBODIMENTS

Preferred embodiments of the present invention will be explained with reference to accompanying drawings.

(A First Embodiment)

Figure 1:
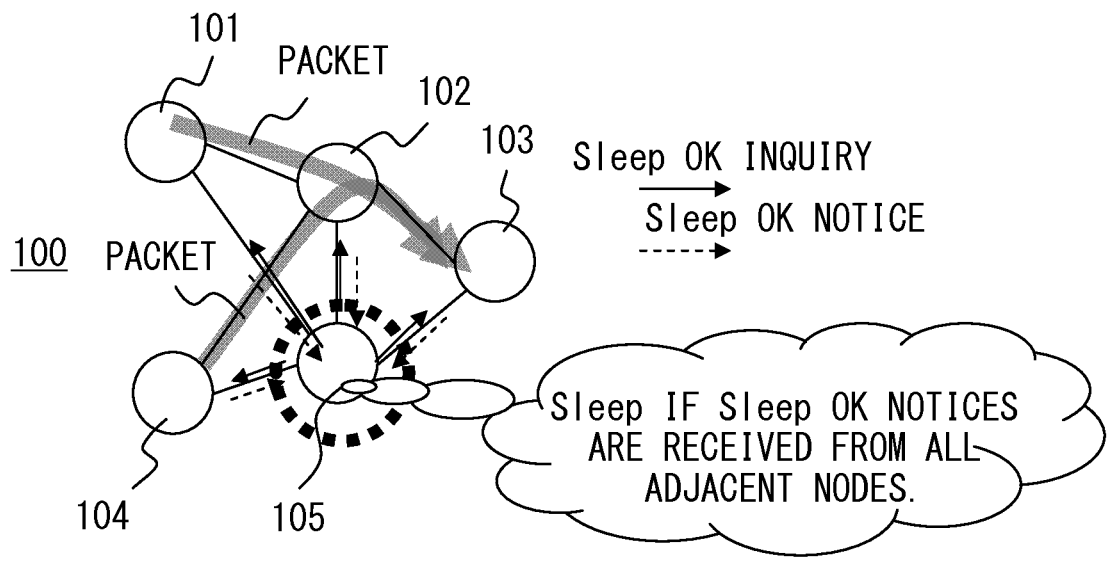
FIG. 1 is the basic principle of a sleep-mode control method according to the first preferred embodiment.

FIG. 1 is the basic principle of a sleep-mode control method according to the first preferred embodiment.

In the first preferred embodiment it is assumed that a network 100 is composed of five nodes 101 through 105.

The node 101 is coupled to nodes 102 and 105.

The node 102 is coupled to nodes 101, 103, 104 and 105.

The node 103 is coupled to nodes 102 and 105.

The node 104 is coupled to nodes 102 and 105.

The node 105 is coupled to nodes 101, 102, 103 and 104.

A case where the node 105 shifts to a sleep mode in the first preferred embodiment will be explained.

In FIG. 1, a packet is transmitted via the route of either node 101→node 102→node 103 or node 104→node 102→node 103.

Since the node 105 does not receive a packet, it attempts to shift to a sleep mode.

When attempting to shift to a sleep mode, the node 105 inquires with all adjacent nodes, that is, the nodes 101 through 104, as to whether it may sleep.

Upon receipt of the inquiry, each of the nodes 101 through 104 determines whether the node 105 may sleep and notifies the node 105 of the result. When determining that there is a low probability that each of the nodes 101 through 104 may request a process from the node 105 (transmit a packet to the node 105), each of the nodes 101 through 104 notifies the node 105 of that the node 105 may sleep.

When reported by all of the adjacent nodes, that is, the nodes 101 through 104, that the node may sleep, the node 105 shifts to a sleep mode.

Figure 2:
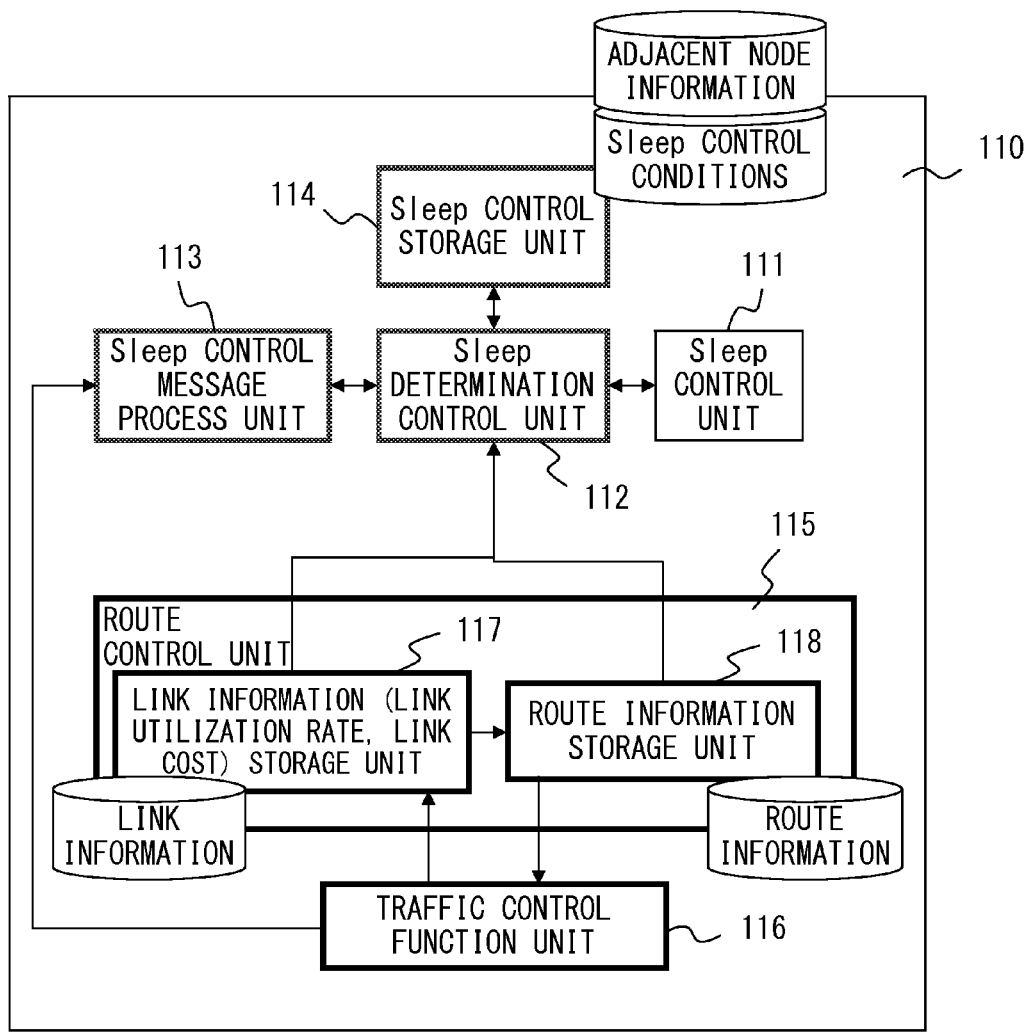
FIG. 2 is a configuration of a node according to the first preferred embodiment.

FIG. 2 is a configuration of a node according to the first preferred embodiment.

The node 110 includes a sleep control unit 111, a sleep determination control unit 112, a sleep control message process unit 113, a sleep control storage unit 114, a route control unit 115, and a traffic control function unit 116.

The sleep control unit 111 enables the node 110 to shift to either a sleep mode or a normal mode, according to the instructions of the sleep determination control unit 112.

The sleep determination control unit 112 (i) manages the status of its own node, (ii) determines whether it should transmit a message about sleep-mode control and issues instructions to the sleep control message process unit 113, (iii) inquires of adjacent nodes whether its own node may sleep, (iv) determines whether it may sleep on the basis of a sleep OK/NG notice from the adjacent nodes and instructs the sleep control unit 111 to shift it to a sleep mode, and (v) controls responses to the inquiry from the adjacent nodes about whether it may sleep, and the like.

The sleep control message process unit 113 transmits/receives messages about the shift and returns to a sleep mode to/from the traffic control function unit 116.

The sleep control storage unit 114 stores adjacent-node information and sleep control conditions.

FIG. 3 is an example of an adjacent node information.

The adjacent-node information includes an IF (interface) number, a connection (next hop), an adjacent-node status, a message transmission status, and a message transmission time as table fields.

The IF number describes the interface number of a node.

The connection (next hop) describes a node coupled to an interface having a corresponding IF number.

The adjacent-node status describes the status of a connection (next hop) node. "Operating" indicates that anode is in a normal mode and "Sleeping" indicates that a node is in a sleep mode.

The message transmission status describes the type of message transmitted to a coupled node.

The message transmission time describes a time at which a message is transmitted.

FIG. 4 illustrates an example of a sleep control condition.

The sleep control condition includes conditions and operations as table fields.

The condition describes determination standards for packet transfer and transmittability determination, which will be described later.

The operation describes the operation of a node when corresponding conditions are met in packet transfer and transmittability determination, which will be described later.

The route control unit 115 illustrated in FIG. 2 includes a link information storage unit 117 and a route information storage unit 118.

The link information storage unit 117 stores link information.

FIG. 5 illustrates an example of link information.

The link information includes an IF (interface) number, a connection (next hop), a band, a transmission rate, a utilization rate (transmission), an influx rate, and a utilization rate (influx) as table fields.

The IF number describes the interface number of a node.

The connection (next hop) describes nodes coupled to the interface having a corresponding IF number.

The band describes a band used between its own node and a coupled node.

The transmission rate describes the transfer rate of transmission data.

The utilization rate (transmission) describes a ratio of the band occupied by the transmission rate.

The influx rate describes the transfer rate of reception data.

The utilization rate (influx) describes a ratio of the band occupied by the influx rate.

The route information storage unit 118 stores route information.

FIG. 6 illustrates an example of route information.

The route information includes a destination, an IF (interface) number, a connection (next hop), a route, a type and a transfer probability as table fields.

The destination describes a node or network to which a packet is addressed.

The IF number describes an interface number capable of reaching the corresponding destination of a node.

The connection (next hop) describes a node coupled to the interface having a corresponding IF number.

The route describes nodes passed through by a packet between a transmitting source and a transmitting destination.

The type describes a type indicating the priority of a corresponding route. A primary route is a route used with top priority and a secondary route is a route used with secondary priority.

The transfer probability describes a probability that a packet may be transferred to a corresponding route of a plurality of routes up to a transmitting destination.

The traffic control function unit 116 illustrated in FIG. 2 transmits/receives packets and messages.

FIG. 7 is a flowchart of a sleep-mode control process of a node according to the first preferred embodiment.

In step S121, the traffic control function unit 116 regularly checks the status of an input packet (that is, whether there is an input packet) to its own node.

In step S122, if there is no input packet, the control process returns to step S121. If there is an input packet, the control process proceeds to step S123.

In step S123, the sleep determination control unit 112 instructs the sleep control message process unit 113 to transmit a sleep OK/NG inquiry ("Sleep OK?") to all adjacent nodes excluding sleep nodes (nodes shifted to a sleep mode). Which adjacent node is in a sleep mode is determined on the basis of the adjacent node status of the adjacent node information.

The sleep control message process unit 113 transmits a sleep OK/NG inquiry ("Sleep OK?") to all adjacent nodes excluding sleep nodes.

In step S124, the sleep control message process unit 113 waits for a response message to the sleep OK/NG inquiry.

In step S125, if the sleep control message process unit 113 receives the response message from all the adjacent nodes to which it has transmitted the sleep OK/NG inquiry or if a certain time (which a user may arbitrarily specify) has elapsed after the sleep OK/NG inquiry, the control process proceeds to step S126. If it does not receive the response message from at least a portion of all the adjacent nodes to which it has transmitted the sleep OK/NG inquiry and also if the certain time has not elapsed after the sleep OK/NG inquiry, the control process returns to step S124.

In step S126, the sleep control determination unit 112 determines whether all the response messages are "Sleep OK?", indicating that it may shift to a sleep mode. If all the response messages are "Sleep OK?", the control process proceeds to step S127. If one or more of the response messages include "Sleep NG?" indicating that it may not shift to a sleep mode, the control process is terminated.

In step S127, the sleep control message process unit 113 notifies all the adjacent nodes of its shift to a sleep mode.

In step S128, the sleep control determination unit 112 instructs the sleep control unit 111 to shift it to a sleep mode and the sleep control unit 111 shifts node 110 to a sleep mode.

FIG. 8 is a flowchart of a response process to the sleep OK/NG inquiry of an adjacent node according to the first preferred embodiment.

In step S131, the sleep control message process unit 113 receives a sleep OK/NG inquiry message ("Sleep OK?").

In step S132, the sleep control determination unit 112 determines transmission probability of a packet for a link that has received the inquiry message. The detailed transmission probability determination of a packet will be described later.

In step S133, if it is determined in the packet transmission probability determination that there is a high probability that the link may be used (that is, there is a high probability that packets may be transmitted to the coupled node of the link), the control process proceeds to step S134. If it is determined that there is not a high probability that the link may be used (that is, there is a low probability that packets may be transmitted to the next connection of the link), the control process proceeds to step S135.

In step S134, the sleep control message process unit 113 notifies the node that has received the inquiry of a sleep impossible (NG) notice ("Sleep NG").

In step S135, the sleep control message process unit 113 notifies the node that has received the inquiry of a sleep possible (OK) notice ("Sleep OK").

Figure 9:
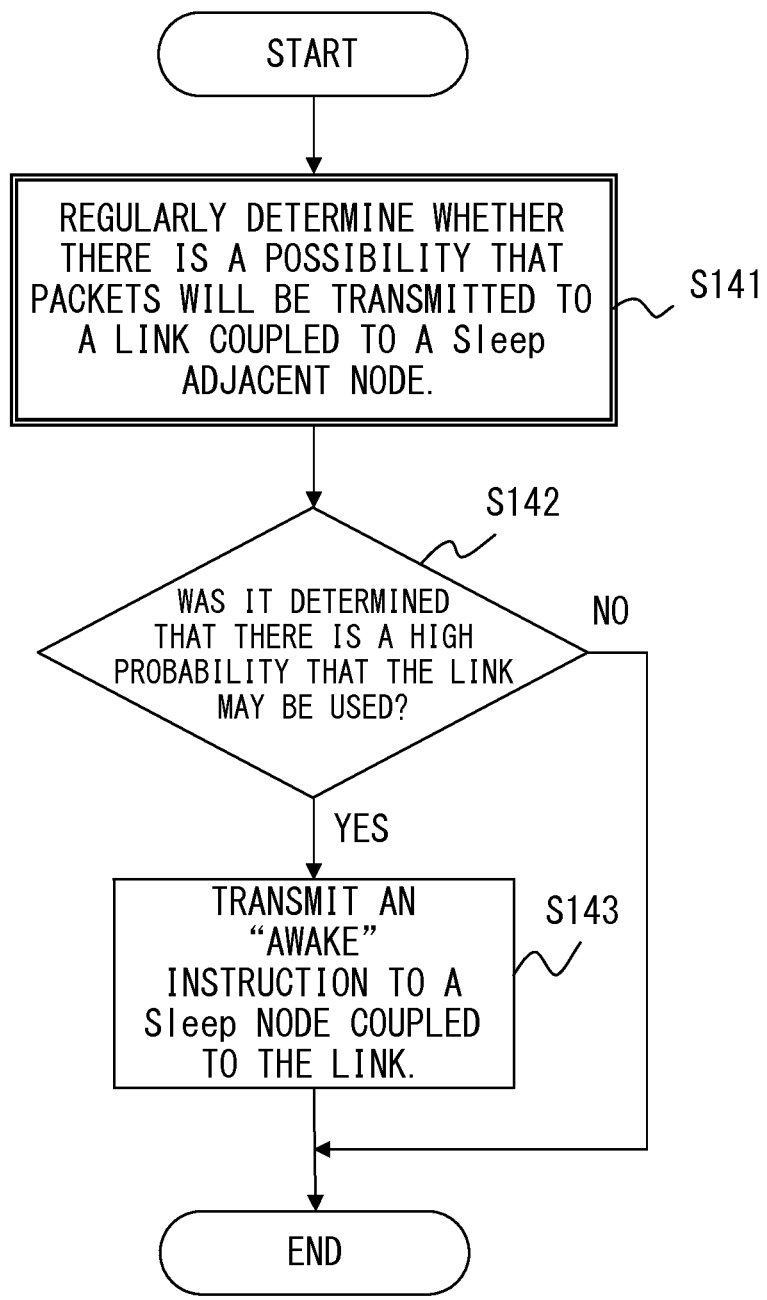
FIG. 9 is a flowchart of the mode modify request process of an adjacent node according to the first preferred embodiment.

FIG. 9 is a flowchart of the mode modify request process of an adjacent node according to the first preferred embodiment.

In step S141, the sleep control determination unit 112 regularly determines transmission probability of a packet for a link coupled to a sleep adjacent node. The details of the determination of transmission probability of a packet will be described later.

In step S142, if the sleep control determination unit 112 determines that there is a high probability that the link may be used (that is, there is a high probability that packets may be transmitted to the coupled node of the link), the control proceeds to step S143. If the sleep control determination unit 112 determines that there is not a high probability that the link may be used (that is, there is a low probability that packets may be transmitted to the coupled node of the link), it terminates the process.

In step S143, the sleep control message process unit 113 transmits an "Awake" instruction for returning from a sleep mode to the connecting sleep node of the link for which it is determined that there is a high probability of being used.

In this case, since a node sometimes shifts to a sleep mode itself and sometimes becomes the adjacent node of a node that wants to sleep, each node performs all the processes of the sleep-mode control, the response process to a sleep OK/NG inquiry, and the mode modify request process.

According to a node according to the first preferred embodiment, the frequent mode switchovers may be avoided without a collective management server.

Furthermore, by issuing an "Awake" instruction to a sleep node having a high probability that packets may be transmitted, a transfer delay due to a long return time from a sleep mode may be prevented by shifting the sleep node from a sleep mode to a normal mode in advance.

Next, the detailed determination process of transmission probability of a packet in step S132 illustrated in FIG. 8 and in step S141 illustrated in FIG. 9 will be explained.

Figure 10:
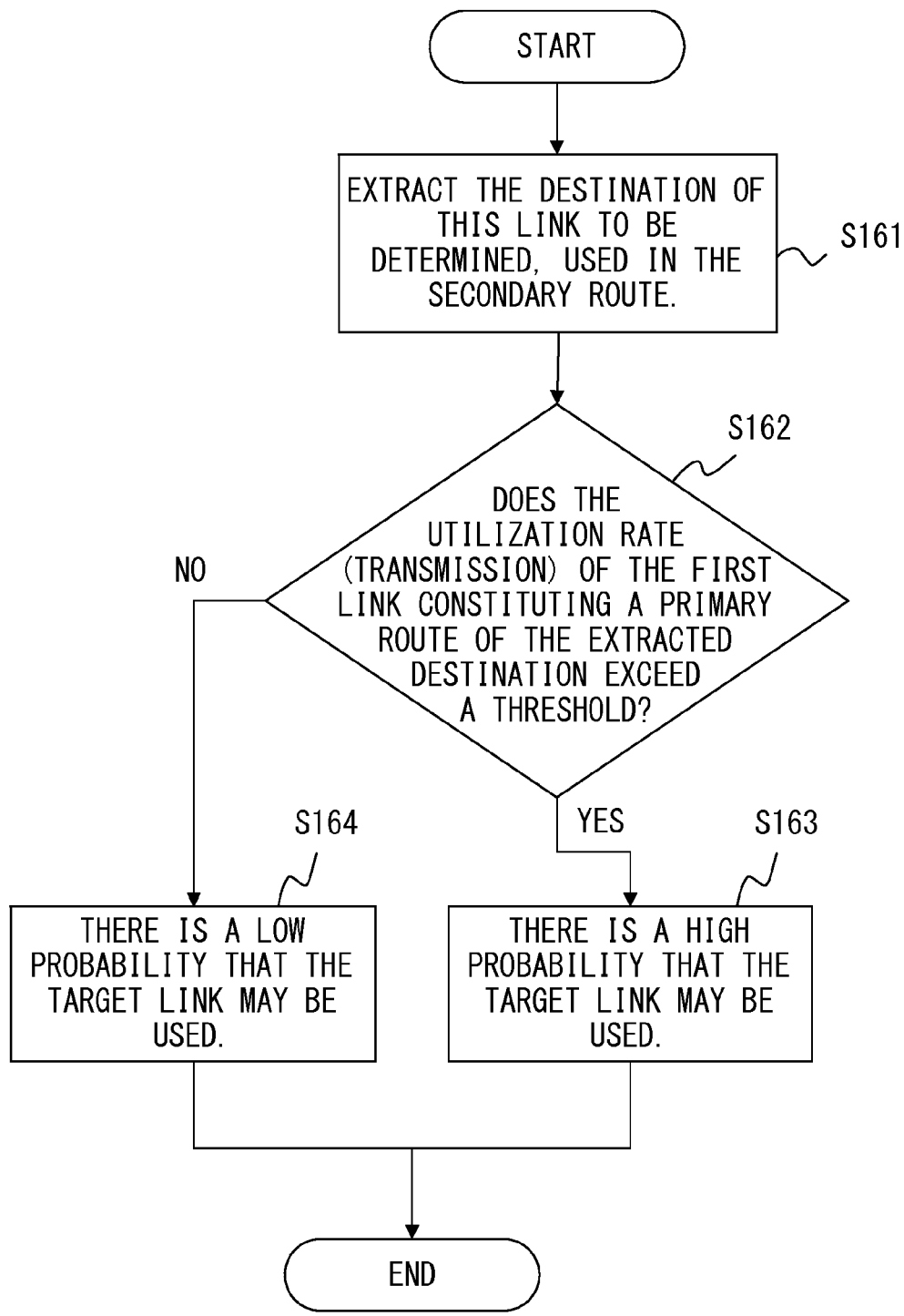
FIG. 10 is a flowchart of determination process of transmission probability of a packet according to the preferred embodiment.

FIG. 10 is a flowchart of determination process of transmission probability of a packet according to the preferred embodiment.

In step S161, the sleep control determination unit 112 refers to route information and extracts the destination of a secondary route using a link to be determined.

In step S162, the sleep control determination unit 112 refers to route information and link information and determines whether the utilization rate (transmission) of the first link constituting a primary route to the extracted destination exceeds a threshold value on the basis of the sleep control conditions. If it exceeds the threshold value, the control process proceeds to step S163. If it is equal to or less than the threshold value, the control process proceeds to step S164.

In step S163, the sleep control determination unit 112 determines that there is a high probability that the link to be determined may be used (that is, there is a high probability that packets may be transmitted to the coupled node of the link).

In step S164, the sleep control determination unit 112 determines that there is a low probability that the link to be determined may be used (that is, there is a low probability that packets may be transmitted to the coupled node of the link).

In step S132 it is determined that there is a low probability that the link may be used, for example in an inquiry from a node that is neither the connection (next hop) node of a primary route nor that of the secondary route.

The above-described determination process of transmission probability of a packet is also used in the second and third preferred embodiments.

Here, a detailed example of determination process of transmission probability of a packet will be explained.

Figure 11:
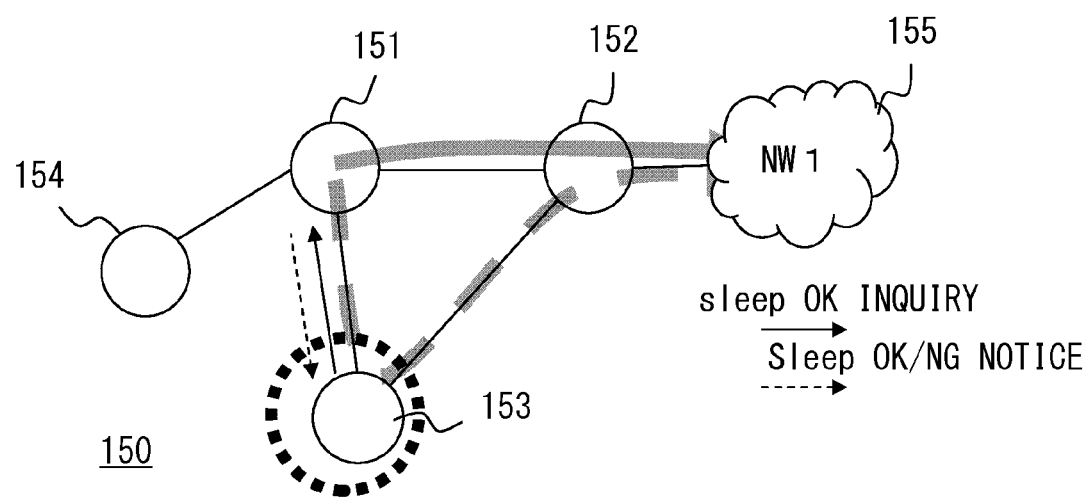
FIG. 11 is a network configuration of a detailed packet transmittability determination process.

FIG. 11 is a network configuration in the detailed determination process of transmission probability of a packet.

A network 150 is composed of nodes 151 through 154 and an NW 155.

The node 151 is coupled to the nodes 152, 153 and 154.

The node 152 is coupled to the nodes 151, 153 and the NW 155.

The node 153 is coupled to the nodes 151 and 152.

The node 154 is coupled to the node 151.

Here, determination process of transmission probability of a packet of the node 151 in the case where the node 153 inquires of the node 151 as to whether node 153 may sleep will be described.

It is assumed that the node 151 stores the sleep control condition illustrated in FIG. 4, the route information illustrated in FIG. 12, and the link information illustrated in FIG. 13.

As illustrated by the route information illustrated in FIG. 12, primary and secondary routes to the destination NW 155 are node 151→node 152→NW 155 and node 151→node 153→node 152→NW 155, respectively.

Since the destination of the secondary route using a link between the nodes 151 and 153 is the NW 155, the NW 155 is extracted (step S161).

According to the route information, the IF number of the primary route of the extracted destination NW 155 is IF 1. According to the link information, the utilization rate (transmission) of the IF 1 is 40%. It is determined whether 40% exceeds the threshold value (step S162), according to the sleep condition. According to the sleep condition, it is when the utilization rate (transmission) exceeds 60% (threshold value) that it is determined that there is a high probability that the secondary route may be used.

Therefore, it is determined that there is a low probability that the secondary route through which the node 153 passes may be used (step S164).

The determination process of transmission probability of a packet is performed thus.

The following may also be used as the determination standard of another piece of determination process of transmission probability of a packet.

(i) Increase rate of utilization rate: When the high increase rate of the utilization rate of a link constituting a primary route continues over a certain time, and the link utilization rate exceeds a certain value, it is determined that there is a high probability that a secondary route is used.

If it is determined that there is a high probability that a secondary route is used on the basis of the increase rate of a utilization rate, a sudden traffic increase that usually may not be coped with even by awakening when a link utilization rate exceeds a threshold value may be coped with.

(ii) Change information of utilization rate on/in day of the week/time zone: Information (e.g., that a probability that the utilization rate of a primary route may exceed a threshold value is 95% in a certain time zone on a certain day of the week) is stored and it is determined that there is a high probability that a secondary route may be used for the next hop of the secondary route in such a time zone.

If a change information of a utilization factor on/in day of the week/time zone is used when there is a feature undergoing traffic fluctuations, sleep control matched with this feature may be exercised.

A detailed example of the sleep-mode control method according to the first preferred embodiment will be explained below.

Figure 14:
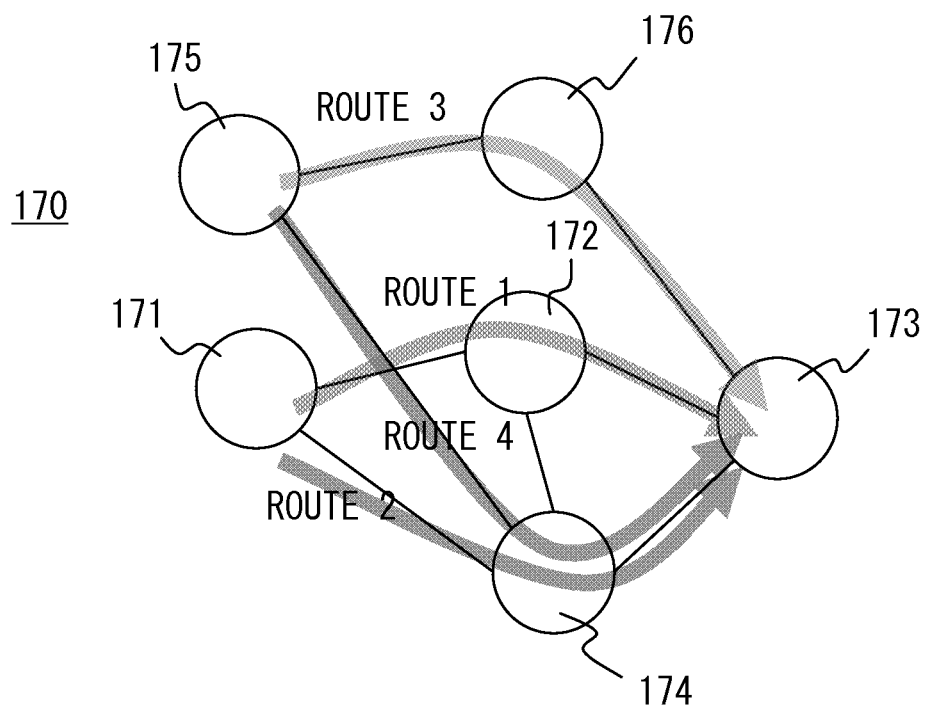
FIG. 14 is a network configuration of a detailed example of the first preferred embodiment.

FIG. 14 is a network configuration of a detailed example of the first preferred embodiment.

In a detailed example of the first preferred embodiment, it is assumed that a network 170 is composed of six nodes 171 through 176.

The node 171 is coupled to the nodes 172 and 174.
The node 172 is coupled to the nodes 171, 173 and 174.
The node 173 is coupled to the nodes 172, 174 and 176.
The node 174 is coupled to the nodes 171, 172 and 173.
The node 175 is coupled to the nodes 174 and 176.
The node 176 is coupled to the nodes 173 and 175.

It is assumed that the node 171 stores the pieces of information illustrated in FIG. 15 through 17.

FIG. 15 illustrates the route information of the node 171.

FIG. 16 illustrates an example of the link information of the node 171.

FIG. 17 illustrates the sleep control conditions of the node 171.

In regard to a packet transfer route from the node 171 to the node 173, according to the route information illustrated in FIG. 15, a primary route (normally used route) becomes node 171→node 172→node 173 (route 1 in FIG. 14) and a secondary route additionally used when the utilization rate of the primary route increases becomes node 171→node 174→node 173 (route 2 in FIG. 14).

It is also assumed that the node 175 stores the pieces of information illustrated in FIGS. 18 and 19.

FIG. 18 illustrates the route information of the node 175.

FIG. 19 illustrates the link information of the node 175.

In regard to a packet transfer route from the node 175 to the node 173, according to the route information illustrated in FIG. 18, a primary route (normally used route) becomes node 175→node 176→node 173 (route 3 in FIG. 14) and a secondary route additionally used when the utilization rate of the primary route increases becomes node 175→node 174→node 173 (route 4 in FIG. 14).

FIG. 20 illustrates the link information of the node 174.

As illustrated in FIG. 20, since the utilization rate of all links coupled to the node 174 is 0%, node 174 transmits the inquiry message regarding whether it may sleep to its adjacent nodes 171, 172, 173 and 175.

Since, according to FIGS. 16 and 17, the utilization rate of the first link constituting the route 1 is 40, the node 171 determines that there is a low probability that the route 2 may be used according to the sleep control conditions illustrated in FIG. 17, determines that the node 174 being the next hop of the route 2 may shift to a sleep mode, and issues a sleep OK notice to the node 174.

Since, according to FIGS. 18 and 19, the utilization rate of the first link constituting the route 3 is 10%, the node 175 determines that there is a low probability that the route 4 may be used, determines that the node 174 being the next hop of the route 4 may shift to a sleep mode, and issues a sleep OK notice to the node 174.

Since the nodes 172 and 173 do not have route information that the next hop is the node 174, they determine that the node 174 may shift to a sleep mode and issue a sleep OK notice to the node 174.

Since the node 174 has received a sleep OK notice from all the adjacent nodes, that is, the nodes 171, 172, 173 and 175, the node 174 notifies the nodes 171, 172, 173 and 175 of its shift to a sleep mode and then shifts to a sleep mode.

Next, a case where the node 174 further shifts to a different status from a sleep mode will be explained.

FIG. 21 illustrates another example of the link information of the node 171.

When the network status changes from the status where the above-described node 174 sleeps and the utilization rate (transmission) in the link information managed by the node 171 becomes 61%, as illustrated in FIG. 21, it corresponds to the second condition of the sleep control conditions illustrated in FIG. 17. Therefore, the node 171 and 174 operate as follows.

The node 171 determines that there is a high probability that the route 2 (secondary route) may also be used and transmits an "Awake" instruction to the sleep node 174.

Upon receipt of the "Awake" instruction, the node 174 returns from the sleep mode.

Figure 22:
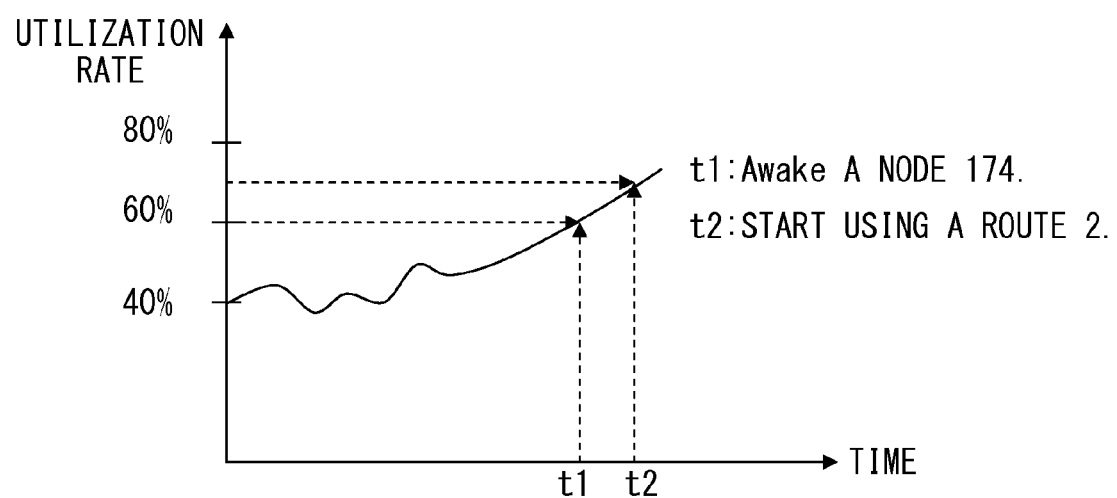
FIG. 22 is a graph indicating the utilization rate of the primary route of a node 171.

FIG. 22 is a graph indicating the utilization rate of the primary route of the node 171. Vertical axis indicates utilization rate, and horizontal axis indicates time.

As illustrated in FIG. 22, when the utilization rate of the primary route (route 1) gradually increases, the node 174 is awoken at time t1 in advance before a packet is transmitted using the secondary route (route 2) at time 2.

By returning a node from the sleep mode before transferring a packet in advance in this way, a transfer delay due to a time necessary to return from the sleep mode when a packet arrives may be avoided.

(A Second Embodiment)

Figure 23:
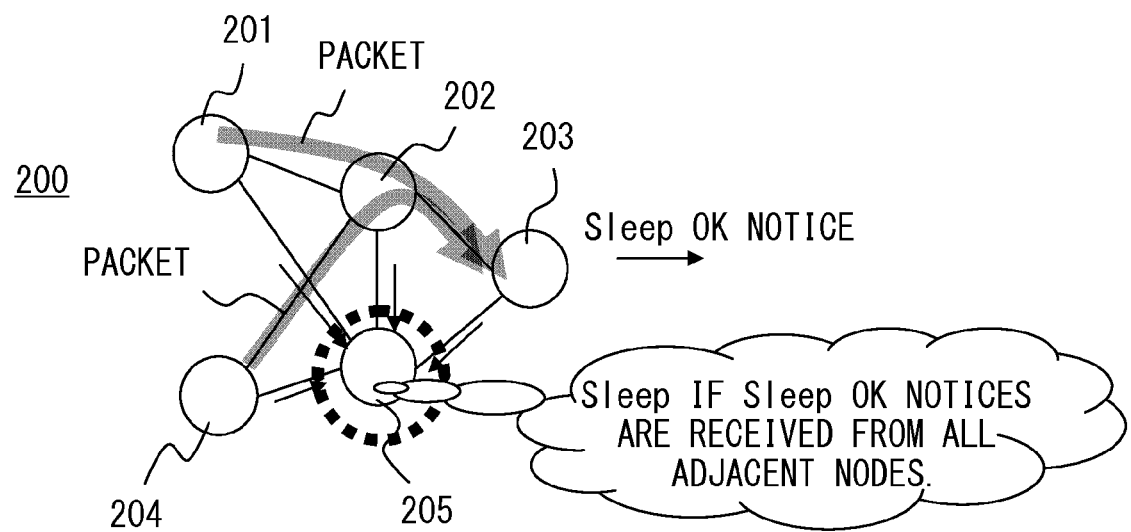
FIG. 23 is the basic principle of a sleep-mode control method according to the second preferred embodiment.

FIG. 23 is the basic principle of the sleep-mode control method according to the second preferred embodiment.

In the second preferred embodiment it is assumed that a network 200 is composed of five nodes 201 through 205.

The node 201 is coupled to the nodes 202 and 205.
The node 202 is coupled to the nodes 201, 203 and 205.
The node 203 is coupled to the nodes 202 and 205.
The node 204 is coupled to the nodes 202 and 205.
The node 205 is coupled to the nodes 201, 202, 203 and 204.

A case where the node 205 shifts to a sleep mode in the second preferred embodiment will be explained.

In FIG. 23, packets are transmitted by the route of either node 201→node 202→node 203 or node 204→node 202→node 203.

Each node regularly determines whether there is a node having a low probability that packets may be transmitted to it, of its adjacent nodes.

Each node notifies adjacent nodes that it has determined that there is a low probability that packets may be transmitted that it may sleep. When there is an adjacent node that is in a sleep mode and it determines that there is a high probability that packets may be transmitted to the adjacent node, it issues an "Awake" instruction to the node and returns it from the sleep mode.

Although in the first preferred embodiment, when receiving an inquiry from another node, each node determines whether the adjacent node may sleep, in the second preferred embodiment, each node positively determines whether its adjacent nodes may sleep.

In FIG. 23, the nodes 201 through 204 determine that there is a low probability that packets may be transmitted to the node 205 and they notify the node 205 that it may sleep.

Upon receipt of a sleep OK notice from all the adjacent nodes, that is, nodes 201 through 204, the node 205 shifts to a sleep mode. When shifting to a sleep mode, the node 205 issues a sleep notice indicating that it has shifted to a sleep mode to all adjacent nodes that are not in a sleep mode, that is, the nodes 201 through 204.

FIG. 24 is a configuration of a node according to the second preferred embodiment.

Anode 210 includes a sleep control unit 211, a sleep determination control unit 212, a sleep control message process unit 213, a sleep control storage unit 214, a route control unit 215, and a traffic control function unit 216.

The sleep control unit 211, the sleep control message process unit 213, the sleep control storage unit 214, the route control unit 215, and the traffic control function unit 216 are the same as the sleep control unit 111, the sleep control message process unit 113, the sleep control storage unit 114, the route control unit 115, and the traffic control function unit 116, respectively.

The sleep determination control unit 212 (i) manages the status of its own node, (ii) determines whether it should transmit a message about sleep-mode control and issues instructions to the sleep control message process unit 213, (iii) regularly determines transmission probability of a packet for its adjacent nodes and transmits a sleep OK notice or an "Awake" instruction on the basis of the determination result, and (iv) instructs the sleep control unit 211 to shift it to a sleep mode and so on, on the basis of the sleep OK notice from all adjacent nodes.

Figure 25:
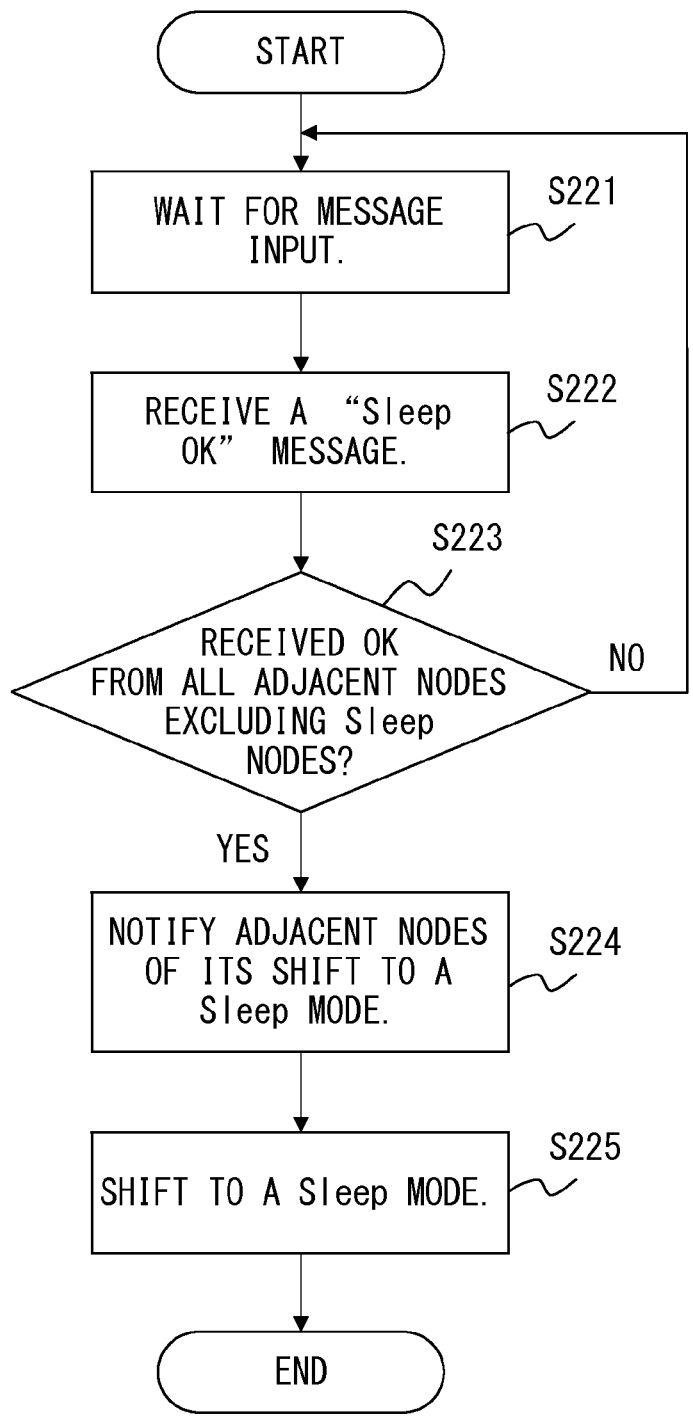
FIG. 25 is a flowchart of the sleep-mode control process of anode according to the second preferred embodiment.

FIG. 25 is a flowchart of a sleep-mode control process of a node according to the second preferred embodiment.

In step S221, the sleep determination control unit 212 waits for a message (notice) from adjacent nodes.

In step S222, the sleep control message process unit 213 receives a sleep OK notice ("Sleep OK") indicating that it may shift to a sleep mode.

In step S223, the sleep determination control unit 212 determines whether it has received "Sleep OK" from all adjacent nodes excluding sleep nodes. If it has received "Sleep OK" from all adjacent nodes excluding sleep nodes, the control process proceeds to step S224. If it has not received "Sleep OK" from all adjacent nodes excluding sleep nodes, the control process returns to step S221.

In step S224, the sleep control message process unit 213 notifies all the adjacent nodes of its shift to a sleep mode.

In step S225, the sleep determination control unit 212 notifies the sleep control unit 211 of its shift to a sleep mode. The sleep control unit 211 shifts the node 210 to a sleep mode.

Figure 26:
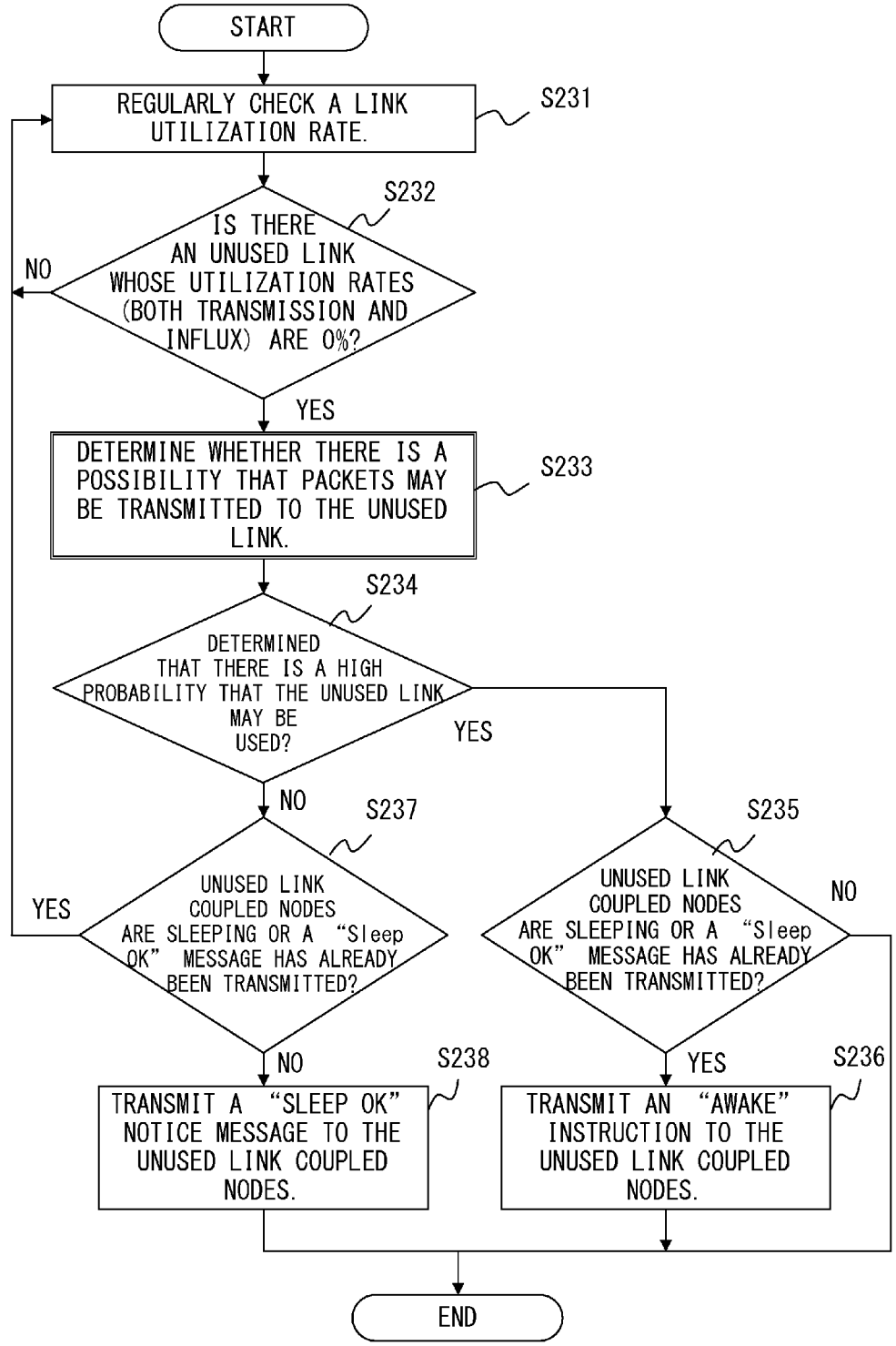
FIG. 26 is a flowchart of the sleep-mode control process of an adjacent node according to the second preferred embodiment.

FIG. 26 is a flowchart of the sleep-mode control process of an adjacent node according to the second preferred embodiment.

In step S231, the sleep determination control unit 212 regularly refers to link information and checks its utilization rate (transmission) and utilization rate (influx).

In step S232, the sleep determination control unit 212 refers to link information and determines whether there is an unused link whose utilization rate (transmission) and utilization rate (influx) are 0%. If there is such an unused link, the control process proceeds to step S233. If there is no such unused link, the control process returns to step S231.

In step S233, the sleep determination control unit 212 determines transmission probability of a packet of the unused link.

In step S234, if the sleep determination control unit 212 determines that there is a high probability that the link may be used in step S233, the control process proceeds to step S235. If the sleep determination control unit 212 determines that there is not a high probability that the link may be used in step S233, the control process proceeds to step S237.

In step S235, the sleep determination control unit 212 determines whether either the coupled node of the unused link is sleeping or a sleep OK message has already been transmitted to an adjacent node, on the basis of adjacent node information. If it is either sleeping or a sleep OK message has already been transmitted to the adjacent node, the control process proceeds to S236. If it is not sleeping and a sleep OK message has not already been transmitted to the adjacent node, the control process is terminated.

In step S236, the sleep control message process unit 213 transmits an "Awake" instruction to nodes coupled to the unused link.

In step S237, the sleep determination control unit 212 determines whether either nodes coupled to the unused link are sleeping or a sleep OK message has already been transmitted to an adjacent node on the basis of adjacent node information. If it is either sleeping or a sleep OK message has already been transmitted to the adjacent node, the control process returns to step S231. If it is not sleeping and a sleep OK message has not already been transmitted to the adjacent node, the control process proceeds to step S238.

In step S238, the sleep control message process unit 213 transmits a sleep OK notice to nodes coupled to a free link.

Since a node sometimes shifts to a sleep mode itself and sometimes becomes the adjacent node of a node that is going to sleep, each node performs both the processes illustrated in FIGS. 25 and 26.

A detailed example of the sleep-mode control method according to the second preferred embodiment will be explained below.

FIG. 27 is a network configuration of a detailed example according to the second preferred embodiment.

In a detailed example according to the second preferred embodiment, it is assumed that a network 240 is composed of four nodes 241 through 244.

The node 241 is coupled to the nodes 242 and 244.
The node 242 is coupled to the nodes 241, 243 and 244.
The node 243 is coupled to the nodes 242 and 244.
The node 244 is coupled to the nodes 241, 242 and 243.

It is assumed that node 241 stores information illustrated in FIGS. 28 and 29.

FIG. 28 illustrates the route information of the node 241.
FIG. 29 illustrates the link information of the node 241.

It is assumed that the nodes 242, 243 and 244 store link information illustrated in FIGS. 30, 31 and 32, respectively.

It is also assumed that each of the nodes 241 through 244 stores the sleep control conditions illustrated in FIG. 17.

In the network 240, when transmitting packets to the node 243, the node 241 may use the two routes of node 241→node 242→node 243 and node 241→node 244→node 243 as a primary route (route 1) and a secondary route (route 2), respectively (see FIG. 28).

Since the utilization factor of a link to the node 244 is 0% and also the utilization rate of a route 1 is 40% as illustrated in FIG. 29, the node 241 determines that a route 2 is not used, according to sleep control conditions. Then, the node 241 transmits a sleep OK notice to the node 244.

Since the utilization rates of links to the node 244, 242→244 and 243→244 are 0%, as illustrated in FIGS. 30 and 31 and also the nodes 242 and 243 do not manage routes in which the node 244 is their next hop, the nodes 242 and 243 transmit a sleep OK notice to the node 244.

Since the node 244 has received a sleep OK notice from all the adjacent nodes, the node 244 notifies the nodes 241, 242 and 243 of its shift to a sleep mode and shifts to a sleep mode.

A case where the status of the network 240 changes from a state where the node 244 has shifted to a sleep mode will be explained.

FIG. 33 illustrates the link information of the node 241.

As illustrated in FIG. 33, when the utilization rate (transmission) of a primary route reaches 61%, the node 241 operates as follows.

The node 241 determines that the probability becomes high that a secondary route may be used, on the basis of the sleep control conditions, and transmits an "Awake" instruction to the node 244.

Upon receipt of the "Awake" instruction, the node 244 returns from the sleep mode.

FIG. 34 is a graph showing the utilization rate of the node 241. The vertical and horizontal axes indicate a utilization rate and a time, respectively.

When the utilization rate of the primary route (route 1) gradually increases as illustrated in FIG. 34, the node 244 is awoken in advance at a time t1 before packets are transferred at a time t2 using a secondary route (route 2).

By returning the node 244 from the sleep mode in advance before packets are transferred to it in this manner, a transfer delay due to a time necessary to return from the sleep mode when packets arrive may be avoided.

A case where the status of the network 240 changes from a state where the node 244 has returned from the sleep mode will be explained.

FIG. 35 illustrates the link information of the node 241 at a time t4.

It is assumed that after the node 244 has returned from the sleep mode, the utilization rate of the route 1 decreases at time t4 illustrated in FIG. 34, as illustrated in FIG. 35, to 49%, that is, to less than or equal to 50%. Then, the node 241 determines, on the basis of the sleep control conditions, that the probability that the route 2 may be used again has become not high, and transmits a sleep OK notice to the node 244.

Since the node 244 has received neither an "Awake" instruction nor a sleep NG notice from the other nodes and has received a sleep OK notice from the node 241, a status where the node 244 has received a sleep OK notice from all the adjacent nodes is established. Therefore, the node 244 notifies the nodes 241, 242 and 243 of its shift to a sleep mode and shifts to a sleep mode.

By defining that a utilization rate used to determine that a probability that a route 2 may be used is not high is lower than a utilization rate used to determine that the probability that a route 2 may be used is high, the frequent switchovers between sleep and awaking may be prevented. If the same utilization rates are defined for them, for example, if it is defined that it is determined that there is a high probability that a route 2 may be used when it is equal to or greater than 60% and that it is determined that the probability becomes not high that a route 2 may be used when it is less than 60%, the node 244 alternately repeats sleep and awaking every time the utilization of a route 1 fluctuates around 60% (fluctuations between t3 and t4 are illustrated in FIG. 34).

For a case where operations up to the node 244 in the example according to the second preferred embodiment wake after they sleep, an another condition for determining that there is a high probability that a secondary route may be used will be explained.

FIG. 36 illustrates the sleep control conditions of the node 241.

Figure 37:
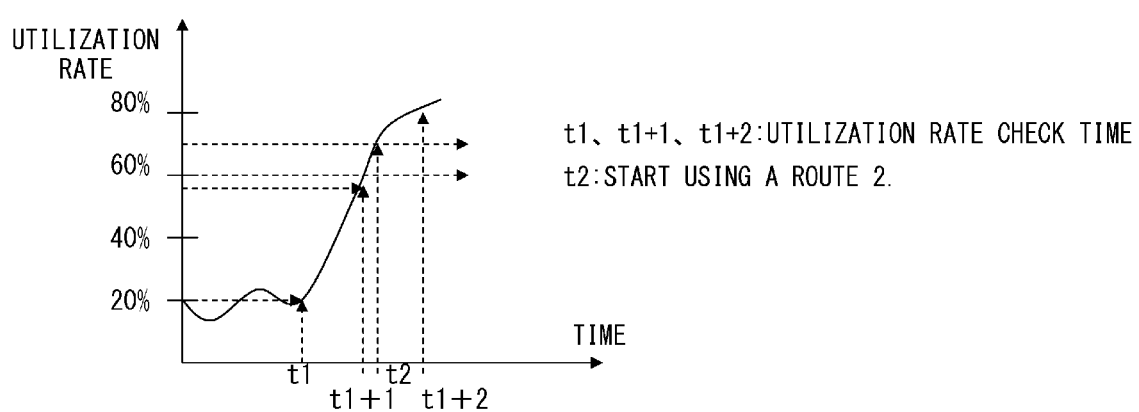
FIG. 37 is a graph indicating another example of the utilization rate of a node 241.

FIG. 37 is a graph indicating another example of the utilization rate of the node 241.

When the utilization rate one minute ago of a primary route and the current utilization rate are compared, if the utilization frate one minute ago is 20% or more and also its increase rate exceeds double, as illustrated by a condition 3 illustrated in FIG. 36, then it is also determined that there is a high probability that a secondary route may be used. In this case, it is assumed that route utilization rates are determined every minute.

As illustrated in FIG. 37, a utilization rate at a certain time t1 is 20%. When the utilization rate of a route 1 tends to suddenly increase and the utilization rate reaches 56% at a time t1+1 after one minute, its increase rate is 2.8 times (56%/20%=2.8). Since it has not reached 60%, a condition 2 is not met at this point in time. However, since the condition 3 is met, it is determined that there is a high probability that a secondary route may be used.

When the utilization rate tends to suddenly increase in this way, according to the condition 2, the node 244 may not be awoken until the subsequent utilization determination cycle t1+2 arrives, that is, may not be awoken before t2 when a route 2 is started to be used. Therefore, the condition 3 becomes effective.

Alternatively, if as with a condition 4 illustrated in FIG. 36 there is an event in which the utilization rate of the route 1 always exceeds 60% between 12:00 and 13:00 on weekdays, this may also be defined as a condition and the node 244 may also be awoken and be unable to be forced to sleep at that time.

Alternatively, in another preferred embodiment, a node may also have the functions of the sleep determination control units of both the first and second preferred embodiments, that is, may inquire as to whether it may sleep and also may issue a sleep OK/NG on the basis of the regular sleep possible/impossible determination.

(Third Embodiment)

Depending on a network configuration, there is a case where frequent shifts/returns to a sleep mode (mode switchover) may not be avoided by mere communications between anode that wants to shift to a sleep mode and its adjacent nodes, described in the first and second preferred embodiments.

Figure 39:
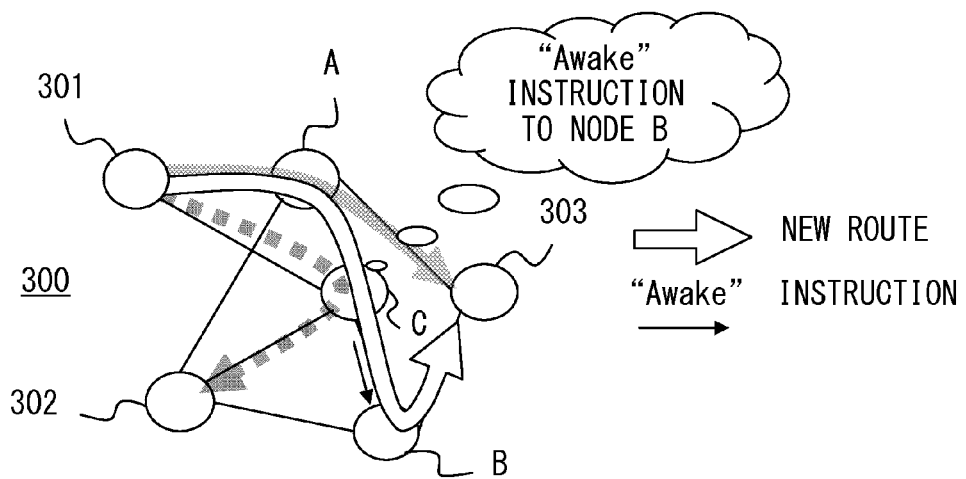
FIG. 39 is an example of the case where frequent mode switchovers occur (No. 2).

FIGS. 38 and 39 are examples of a case where frequent mode switchovers occur.

A network 300 is composed of six nodes, edge nodes 301 through 303 and core nodes A, B and C. In the network 300, packets do not pass through the node B and the adjacent nodes of the node B determine that the node B may sleep, according to the sleep control of the first or second preferred embodiment.

However, the utilization rate of a route from the node 301 to the node 303 through the node A (hereinafter described as a route 301→A→303) actually increases, and as a result a new route 301→A→C→B→303 is used and the node B is awoken.

The starting node 301 and the switchover node A may grasp the utilization rate of the route 301→A→303 and determine that there is a possibility that the new route 301→A→C→B→303 may be used and neither is adjacent to the node B. Therefore, the method according to the first and second preferred embodiment may not avoid frequent mode switchovers.

Figure 40:
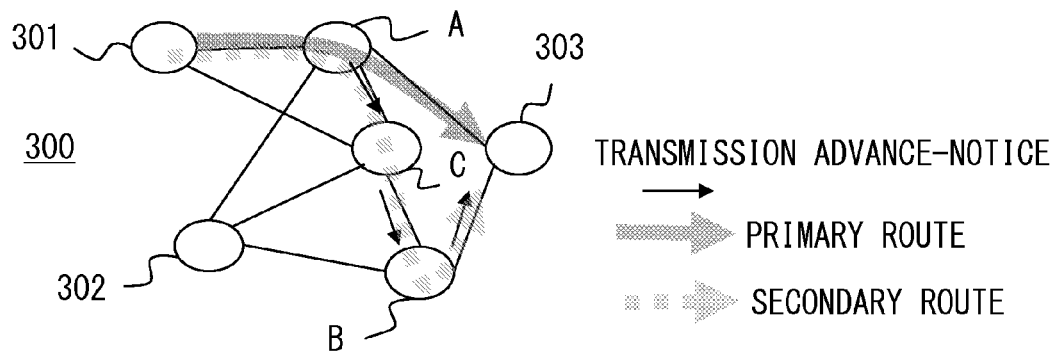
FIG. 40 is the basic principle of a sleep-mode control method according to the third preferred embodiment (No. 1).

FIGS. 40 and 41 are the basic principle of a sleep-mode control method according to the third preferred embodiment.

In the third preferred embodiment it is assumed that the network 300 is composed of six nodes 301 through 303 and A through C.

The node 301 is coupled to the nodes A and C.
The node 302 is coupled to the nodes A, B and C.
The node 303 is coupled to the nodes A and B.
The node A is coupled to the nodes 301, 302, 303 and C.
The node B is coupled to the nodes 302, 303 and C.
The node C is coupled to the nodes 301, 302, A and B.

In FIGS. 40 and 41, in regard to a packet route from the node 301 to the node 303, it is assumed that node 301→node A→node 303 and node 301→node A→node C→node B→node 303 are assigned as primary and secondary routes, respectively.

When determining that the utilization rate of a link constituting a current route (primary route) used for a packet transfer increases and that there is a high probability that a second route (secondary route) may be used in order to avoid congestion, the node A transmits to the node C, which is the next hop of the secondary route, a packet transmission advance-notice message indicating that there is a high probability that packets may be transmitted to it.

Upon receipt of the packet transmission advance-notice message, the node C further transmits the packet transmission advance-notice message to the node B, which is the next hop of the secondary route (see FIG. 40).

As illustrated in FIG. 41, when the nodes C and B to which the packet transmission advance-notice is transmitted are in a sleep mode, an "Awake" instruction is given to request a return from the sleep mode before the packet transmission advance-notice message is transmitted to them.

After that determination that the probability has become low that the secondary route may be used, the node that has issued the transmission advance-notice message transmits a packet transmission advance-notice release message.

The node that has received the transmission advance-notice message does not shift to a sleep mode until it receives at least a packet transmission advance-notice release message.

Figure 42:
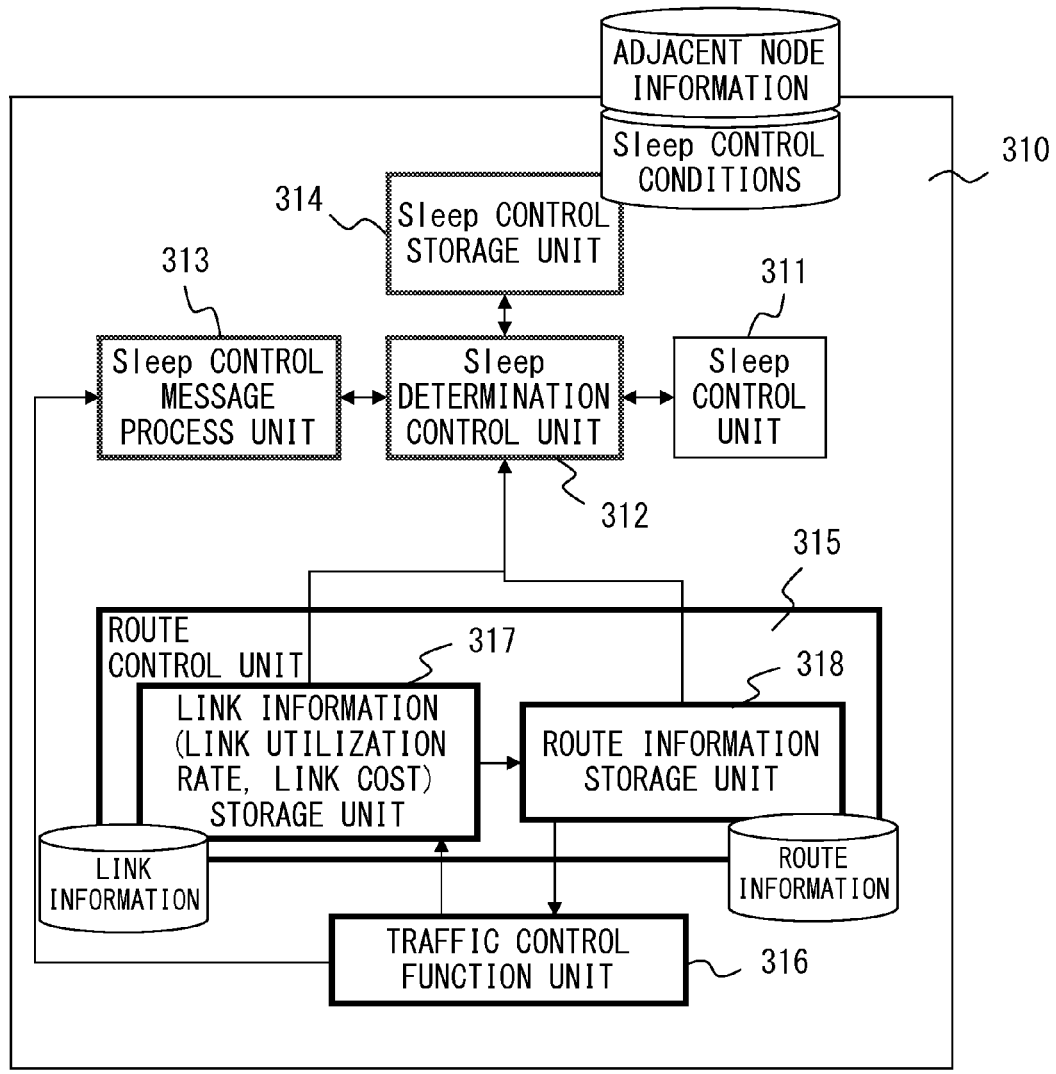
FIG. 42 is a configuration of a node according to the third preferred embodiment.

FIG. 42 is a configuration of a node according to the third preferred embodiment.

A node 310 includes a sleep control unit 311, a sleep determination control unit 312, a sleep control message process unit 313, a sleep control storage unit 314, a route control unit 315, and a traffic control function unit 316.

The sleep control unit 311, the sleep control message process unit 313, the sleep control storage unit 314, the route control unit 315, and the traffic control function unit 316 are the same as the sleep control unit 111, the sleep control message process unit 113, the sleep control storage unit 114, the route control unit 115 and the traffic control function unit 116, respectively, of the first preferred embodiment.

The sleep determination control unit 312 (i) manages the status of its own node, (ii) determines whether it should transmit a message about sleep-mode control and issues instructions to the sleep control message process unit 313, (iii) inquires of adjacent nodes whether it may sleep, (iv) determines whether it may sleep on the basis of a sleep OK/NG notice from the adjacent nodes and instructs the sleep control unit 311 to shift it to a sleep mode, (v) responds to the inquiry from the adjacent nodes about whether it may sleep, (vi) notifies adjacent nodes that have a possibility that packets may be transmitted to them of a transmission advance-notice/advance-notice release message, and (vii) issues an "Awake" instruction to sleeping adjacent nodes that have a possibility that packets may be transmitted to them, and the like.

The sleep determination control unit 312 according to the third preferred embodiment is obtained by adding a certain function to the sleep determination control unit 112 of the first preferred embodiment. The node 310 according to the third preferred embodiment may perform the same process as the node 110 of the first preferred embodiment. Since the process of a sleep OK/NG inquiry and the like of the node 310 according to the third preferred embodiment is the same as the node 110 according to the first preferred embodiment, its explanation is omitted here.

Alternatively, the functions of a transmission advance-notice/advance-notice release notice and the like may be added to the sleep determination control unit 212 of the second preferred embodiment.

The generation process of the transmission advance-notice message and advance-notice release message of a node will be explained.

FIG. 43 is a flowchart of the transmission advance-notice message and advance-notice release message generation process of a node according to the third preferred embodiment.

In step S321, the sleep determination control unit 312 refers to route information and link information and regularly checks the utilization rate of a link constituting a route passing through its own node.

In step S322, the sleep determination control unit 312 determines the transmission probability of a packet of a link whose utilization rate (transmission) is 0%.

If it is determined in step S323 that there is a high probability that the determined link may be used, the control process proceeds to step S324. If it is determined that there is not a high probability that the determined link may be used, the control process proceeds to step S325.

In step S324, the sleep control message process unit 313 refers to the route information and transmits a transmission advance-notice message indicating that there is a high probability that packets may be transmitted to a node to the next hop of a secondary route.

In step S325, the sleep determination control unit 312 determines whether a transmission advance-notice message has already been transmitted to the next hop of the secondary route, on the basis of adjacent node information. If it has already been transmitted, the control process proceeds to step S324. If it has not been transmitted yet, the control process is terminated.

In step S326, the sleep control message process unit 313 refers to the route information and transmits a transmission advance-notice release message to the next hop of the secondary route.

Next, a case where a node receives either a transmission advance-notice or an advance-notice release message will be explained.

Figure 44:
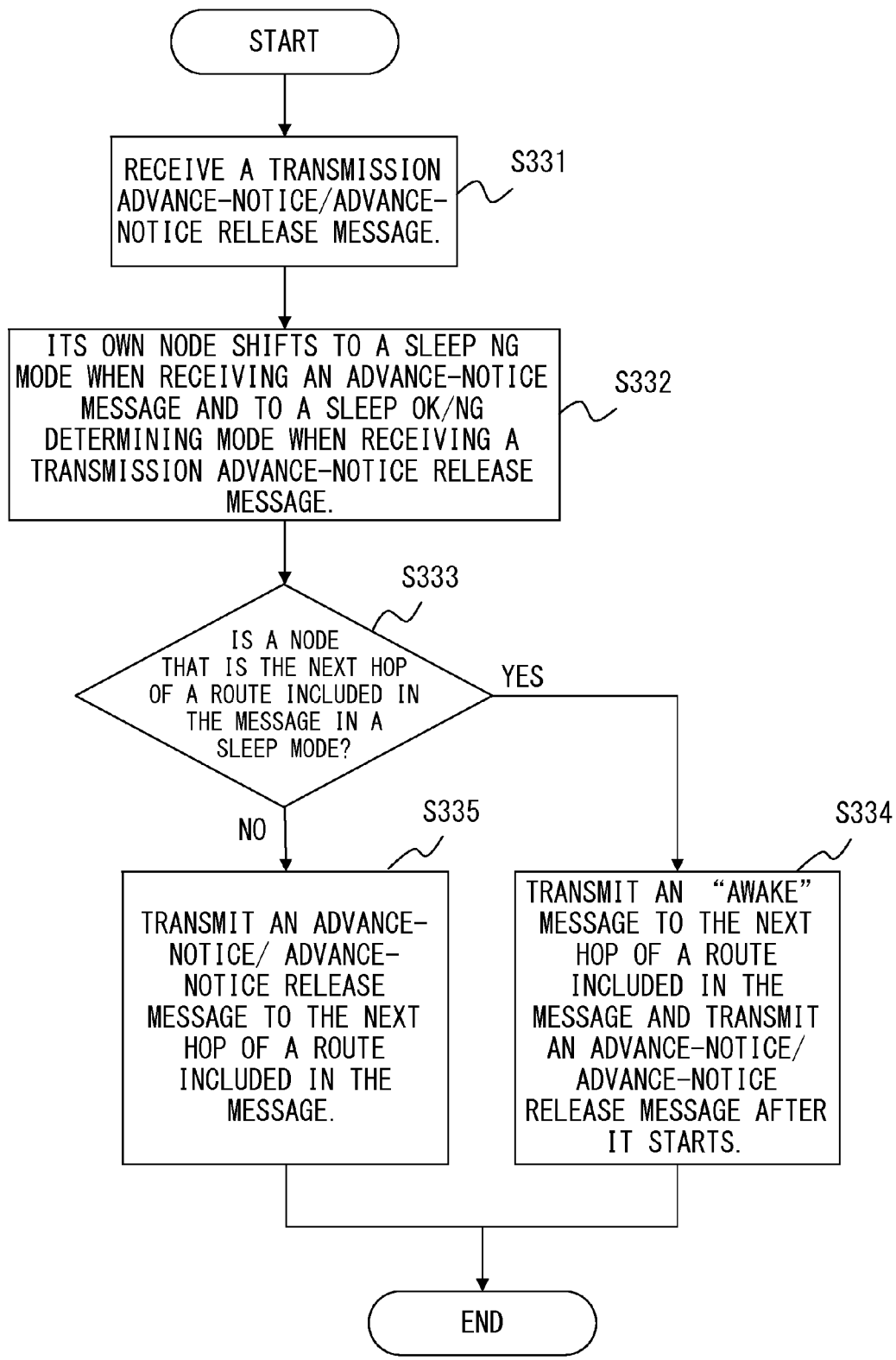
FIG. 44 is a flowchart of a sleep-mode control process of a node according to the third preferred embodiment.

FIG. 44 is a flowchart of a sleep-mode control process of a node according to the third preferred embodiment.

In step S331, the sleep control message process unit 313 receives either a transmission advance-notice or an advance-notice release message.

In step S332, if the received message is a transmission advance-notice message, the sleep determination control unit 312 shifts to a sleep NG mode. If the received message is a transmission advance-notice release message, the sleep determination control unit 312 shifts to a sleep OK/NG determining mode. The sleep NG mode does not make a sleep OK/NG inquiry even when there is no input packet and does not shift to a sleep mode even when receiving a sleep OK notice, for example. Therefore, a node in a sleep NG mode does not shift to a sleep mode. The sleep OK/NG determining mode makes a sleep OK/NG inquiry when there is no input packet and shifts to a sleep mode when receiving a sleep OK notice from all adjacent nodes, for example. In other words, the sleep OK/NG determining mode determines whether it may sleep from time to time according to its status and may shift to a sleep mode according to the determination result.

In step S333, the sleep determination control unit 312 determines whether a node that is the next hop of a route included in a transmission advance-notice message or a transmission advance-notice release message is in a sleep mode, on the basis of adjacent node information. If the next hop is in a sleep mode, the control process proceeds to step S334. If the next hop is not in a sleep mode, the control process proceeds to step S335.

In step S334, the sleep control message process unit 313 transmits an "Awake" instruction to a node that is the next hop. If the node has received a transmission advance-notice message in step S331 when the node is activated, the sleep control message process unit 313 transmits a transmission advance-notice message to the node. If it has received a transmission advance-notice release message in step S331, it transmits a transmission advance-notice release message to the node.

In step S335, if the sleep control message process unit 313 has received a transmission advance-notice message in step S331, it transmits a transmission advance-notice message to the node that is the next hop. If it has received a transmission advance-notice release message in step S331, it transmits a transmission advance-notice release message to the node that is the next hop.

A detailed example of the sleep mode control method in the third preferred embodiment will be explained below.

Figure 45:
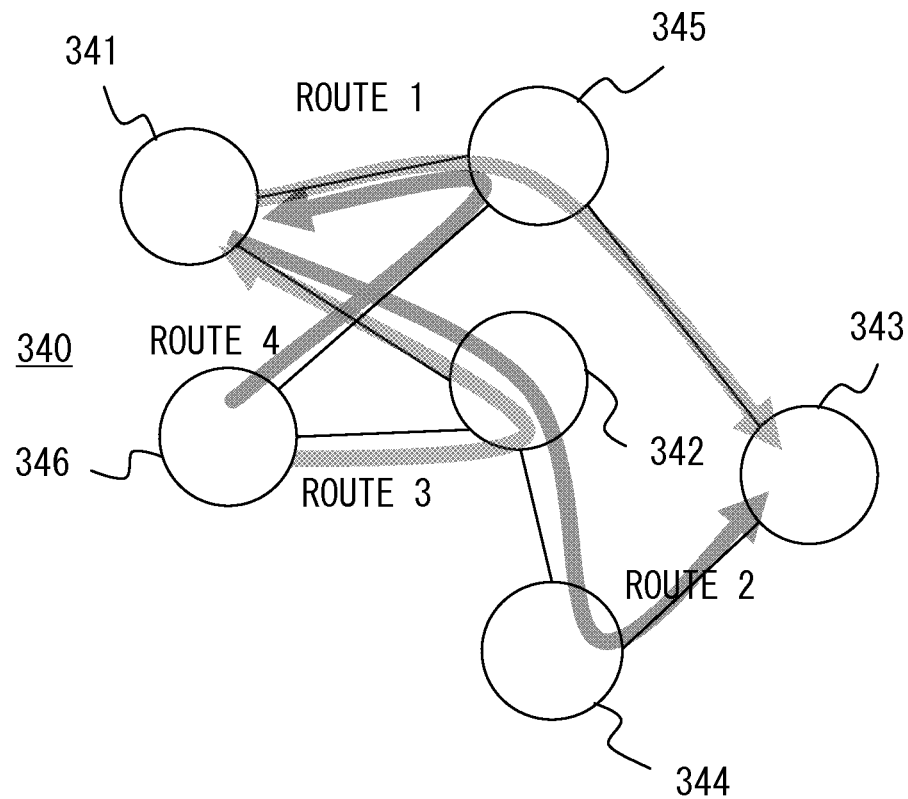
FIG. 45 is a network configuration of a detailed example of the third preferred embodiment.

FIG. 45 is a network configuration of a detailed example of the third preferred embodiment.

In the detailed example of the third preferred embodiment, it is assumed that a network 340 is composed of six nodes 341 through 346.

The node 341 is coupled to the nodes 342 and 345.
The node 342 is coupled to the nodes 341, 344 and 346.
The node 343 is coupled to the nodes 344 and 345.
The node 344 is coupled to the nodes 342 and 343.
The node 345 is coupled to the nodes 341, 343 and 346.
The node 346 is coupled to the nodes 342 and 345.

It is assumed that each of the nodes 341 through 346 stores sleep control conditions illustrated in FIG. 46.

It is assumed that the node 341 stores information illustrated in FIGS. 47 and 48.

FIG. 47 illustrates the route information of the node 341.
FIG. 48 illustrates an example of the link information of the node 341.

It is assumed that the node 346 stores information illustrated in FIGS. 49 and 50.

FIG. 49 illustrates the route information of the node 346.
FIG. 50 illustrates the link information of the node 346.

It is assumed that the node 344 stores link information illustrated in FIG. 51.

In the network 340 there is a primary route (route 1) of node 341→node 345→node 343 and a secondary route (route 2) of node 341→node 342→node 344→node 343, both of which are managed by the node 341, and there is a primary route (route 3) of node 346→node 342→node 341 and a secondary route (route 4) of node 346→node 345→node 341, both of which are managed by the node 346.

At first, the utilization rate of the route 1 is 40%, as illustrated in FIG. 48, the utilization rate of the route 3 is 10%, as illustrated in FIG. 50, and the routes 2 and 4 are not used.

Since as illustrated in FIG. 51 both the utilization rate (transmission) and utilization rate (influx) of a connecting link are 0%, the node 344 inquires of its adjacent nodes 342 and 343 whether the node 344 may sleep.

Since neither of the nodes 342 and 343 manage a route whose next hop is node 344, they issue a sleep OK notice in response to the inquiry.

Since the node 344 receives a sleep OK notice from all the adjacent nodes, the node 344 issues a notice to the adjacent nodes indicating that the node 344 is shifting to a sleep mode and shifts to a sleep mode.

Next, it is assumed that the status of the network 340 changes.

FIG. 52 illustrates example of the link information of the node 341.

It is assumed that the status of the network 340 changes and the utilization rate of the route 1 reaches 61%, as illustrated in FIG. 52.

At this moment, the node 341 determines that there is a high probability that the secondary route 2 may be used, on the basis of its sleep control conditions.

The node 341 transmits a transmission advance-notice message to the node 342, which is the next hop of the secondary route, according to its route information. The format of this transmission advance-notice message is illustrated in FIG. 53.

The transmission advance-notice message includes a transmitting source node, a destination node, route information, and a message type. The route information describes nodes which are passed through between a transmitting source node and a destination node in packet transfer.

The node 342 receives a transmission advance-notice message and shifts to a sleep NG mode. The node 342 also attempts to transfer the transmission advance-notice message to the node 344, which is the next hop of the node 342. However, since the node 344 is in a sleep mode, the node 342 first issues an "Awake" instruction to the node 344.

Upon receipt of the "Awake" instruction, the node 344 returns from the sleep mode.

The node 342 transfers the transmission advance-notice message to the node 344.

Since the node 344 has received the transmission advance-notice message, it shifts to a sleep NG mode and further transfers the transmission advance-notice message to the node 343, which is the next hop of the node 344.

The node 343 also shifts to a sleep NG mode. Since the node 343 is the end node (destination), it does not transfer the transmission advance-notice message.

Thus, the node 344 may be awoken before packets are transferred by the secondary route (route 2) and a transfer delay due to a time required to return from the sleep mode may be avoided.

It is assumed that the status of the network 340 has further changed.

FIG. 54 illustrates example of the link information of the node 341.

When, as illustrated in FIG. 54, the utilization rate of the route 1 falls to 49% after the node 344 is awoken, the following operation is performed.

Even though the node 341 has previously transmitted a transmission advance-notice message to the next hop of the route 2, the node 341 determines that since the utilization rate of the route 1 has fallen below 50%, the probability has become not high that the route 2 may be used on the basis of the sleep control conditions and it transmits a transmission advance-notice release message as illustrated in FIG. 55 to the next hop of the route 2.

Upon receipt of the transmission advance-notice release message, the node 342 shifts from the sleep NG mode to a sleep OK/NG determining mode and transfers the transmission advance-notice release message to the node 344.

Upon receipt of the transmission advance-notice release message, the node 344 shifts from the sleep NG mode to a sleep OK/NG determining mode and transfers the transmission advance-notice release message to the node 343.

Upon receipt of the transmission advance-notice release message, the node 343 shifts from the sleep NG mode to a sleep OK/NG determining mode.

Since no packet has been input to the node 344, it inquires of its adjacent node whether it may sleep again and shifts to a sleep mode again in the above-described procedure.

Next, a case where not only a starting node but also respective nodes including relay nodes manage route information will be described.

FIG. 56 illustrates the route information of the node 342.

FIG. 57 illustrates the route information of the node 344.

Even though in the above explanation a transmission advance-notice message includes route information, when as illustrated in FIGS. 56 and 57 not only a starting node but also respective nodes including relay nodes manage route information, route information included in the transmission advance-notice message transmitted by the node 341 may also have the format illustrated in FIG. 58.

The route information of the transmission advance-notice message illustrated in FIG. 58 describes the number of a route to be used. In FIG. 58, route 2 is described.

According to a node according to the third preferred embodiment, frequent shifts/returns to a sleep mode may be avoided without a collective management server and transfer delays due to a time required to return from a sleep mode may be avoided.

Figure 59:
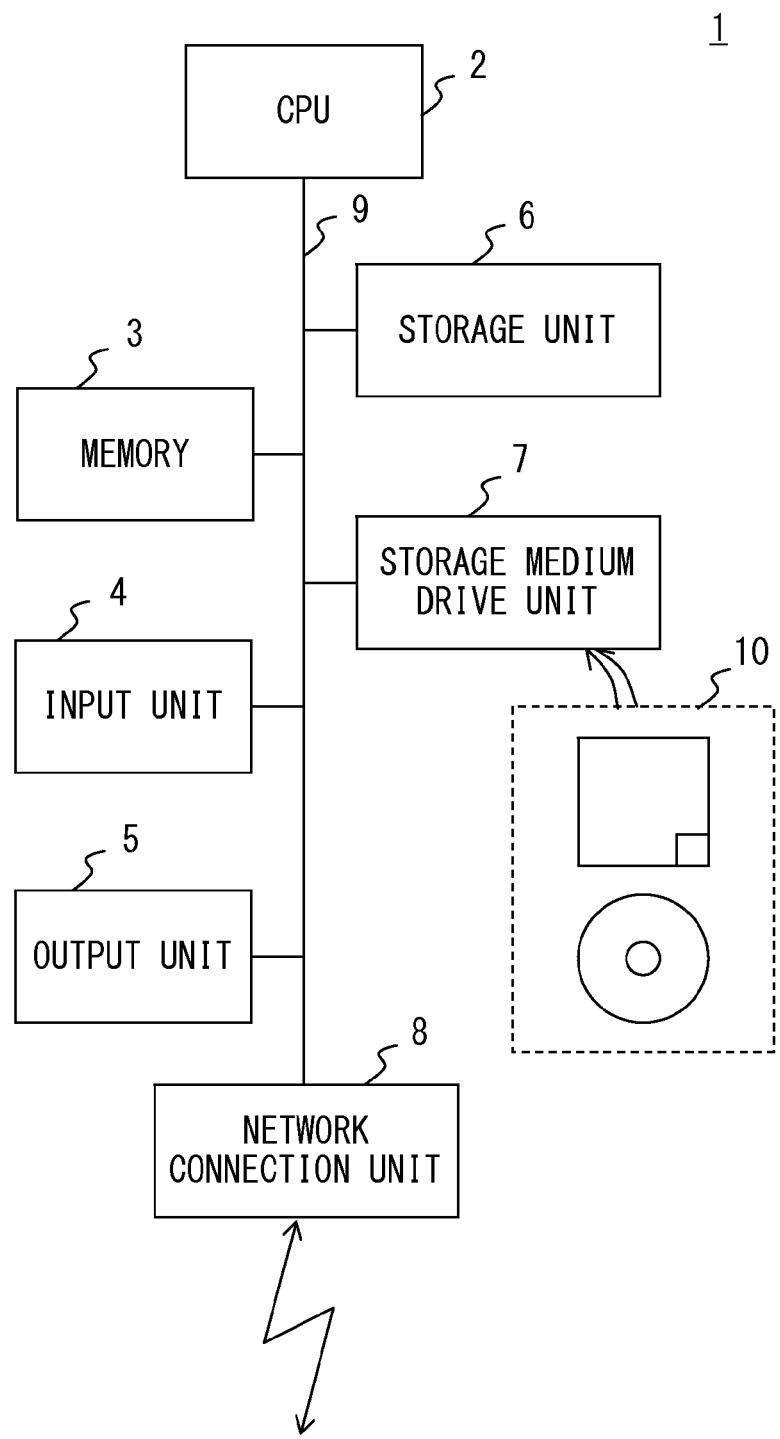
FIG. 59 is a configuration of an information processing device.

The above-described node may be constituted, for example, using an information processing device (computer) as illustrated in FIG. 59.

An information processing device 1 includes a CPU (central processing unit) 2, memory 3, an input unit 4, an output unit 5, a storage unit 6, a storage medium drive unit 7, and a network connection unit 8, which are coupled to each other by a bus 9.

The CPU controls the entire information processing device 1.

The memory 3 is ROM (read-only memory), RAM (random-access memory) or the like, for temporarily storing a program or data that are stored in the storage unit 6 (or a portable storage medium 10) when a program is executed. The CPU 2 performs the above-described various processes by executing a program using the memory 3.

In this case, a program code itself read from the portable storage medium 10 or the like realizes the new functions of the present invention and a storage medium or the like on which the program code is recorded constitutes the present invention.

The input unit 4 is, for example, a keyboard, a mouse, a touch panel, or the like.

The output unit 5 is, for example, a display, a printer or the like.

The storage unit 6 is, for example, a magnetic disk device, an optical disk device, a tape device, or the like. The information processing device 1 stores the above program and data in the storage unit 6, and if requested, reads them into the memory 3 and uses them.

The storage medium drive unit 7 drives the portable storage medium 10 and accesses its recorded content. For the portable storage medium, a memory card, an arbitrary computer-readable non-transitory storage medium such as a flexible disk, a CD-ROM (compact disk read-only memory), an optical disk, a magneto-optical disk, or the like is used. A user stores the above program and data in this portable storage medium 10, and reads them into the memory 3 and use them as requested.

The network connection unit 8 is coupled to an arbitrary communication network such as a LAN (local area network) or the like and exchanges data accompanying communications.

The present invention is not limited to the above-described preferred embodiments and may take various configurations or shapes as long as they do not depart from the spirit and scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understand that the various changes, substitutions, and alterations could be made hereto without departing from the spirit and scope of the invention.

What is claimed is:

1. An information processing device coupled to a plurality of adjacent nodes, the information processing device comprising:
    a storage unit configured to store link information which indicates whether or not a packet is transmitted to and received from each adjacent node of the plurality of adjacent nodes;
    a traffic control unit configured to check whether or not an adjacent node exists with no packet transmitted and received of the plurality of adjacent nodes by regularly referring to the link information; and
    a sleep determination process unit configured to determine whether there is a possibility that packets are transmitted to a first adjacent node when no packet is transmitted to the first adjacent node of the plurality of adjacent nodes and received from the first adjacent node of the plurality of adjacent nodes, and to transmit a sleep OK notice to the first adjacent node indicating that the first adjacent node shift to a sleep mode when the sleep determination process unit determines that there is a low probability that packets are transmitted to the first adjacent node,
    wherein a second route is used when a transmission utilization rate of a first link constituting a first route that is currently transferring packets exceeds a first threshold,
    the second route includes a second link to the first adjacent node and a transmission utilization rate and an influx utilization rate of the second link are substantially zero, and
    the sleep determination process unit determines that there is a high probability that packets are transmitted to the first adjacent node when the transmission utilization rate of the first link exceeds a second threshold which is equal to or less than the first threshold, and determines that there is a low probability that packets are transmitted to the first adjacent node when the transmission utilization rate of the first link is less than the second threshold.

2. The information processing device according to claim 1, wherein
    when it is determined that there is a high probability that packets are transmitted to the first adjacent node and the first adjacent node is in a sleep mode, the sleep determination process unit transmits an "Awake" instruction to the first adjacent node to return the first adjacent node from a sleep mode.

3. The information processing device according to claim 2, wherein
    when it is determined that there is a high probability that packets are transmitted to the first adjacent node, the sleep determination process unit transmits a packet transmission advance-notice message to a node which is a next hop of the second route.

4. An information processing device coupled to a plurality of adjacent nodes, the information processing device comprising:
   a storage unit configured to store adjacent node information which indicates whether or not each adjacent node of the plurality of adjacent nodes is a sleep node;
   a traffic control unit configured to check whether a packet has been input to the information processing device;
   a sleep inquiry process unit configured to determine whether each adjacent node of the plurality of adjacent nodes is a sleep node on the basis of the adjacent node information and to inquire of all adjacent nodes excluding adjacent nodes determined as sleep nodes whether the node of the information processing device sleeps when the traffic control unit has determined that no packet has been input; and
   a sleep determination unit configured to determine whether the information processing device should shift to a sleep mode on the basis of a response to the inquiry of the sleep inquiry process unit from the adjacent nodes excluding adjacent nodes determined as sleep nodes.

5. The information processing device according to claim 4, wherein
   when receiving a notice from all the adjacent nodes excluding sleep nodes that the information processing device sleeps, the information processing device shifts to a sleep mode.

6. The information processing device according to claim 5, wherein the information processing device
   determines whether there is a possibility that packets are transmitted to an inquiry source node when receiving an inquiry about whether the inquiry source node sleeps and
   notifies the inquiry source node that the inquiry source node sleeps when it is determined that there is a low probability that packets are transmitted to the inquiry source node.

7. A sleep mode control method for a computer coupled to a plurality of adjacent nodes and comprising a storage unit configured to store link information which indicates whether or not a packet is transmitted to and received from each adjacent node of the plurality of adjacent nodes, the sleep mode control method comprising:
   checking whether a packet has been input to the computer;
   inquiring of all adjacent nodes excluding sleep nodes whether the computer sleeps when no packet has been input;
   checking whether or not an adjacent node exists with no packet transmitted and received of the plurality of adjacent nodes by regularly referring to the link information which indicates whether or not a packet is transmitted to and received from each adjacent node of the plurality of adjacent nodes;
   determining whether there is a possibility that packets are transmitted to a first adjacent node when no packet is transmitted to the first adjacent node of the plurality of adjacent nodes and received from the first adjacent node of the plurality of adjacent nodes; and
   transmitting to the adjacent node a sleep OK notice indicating that the first adjacent node shifts to a sleep mode, when it is determined that there is a low probability that packets are transmitted to the first adjacent node,
   wherein a second route is used when a transmission utilization rate of a first link constituting a first route that is currently transferring packets exceeds a first threshold,
   the second route includes a second link to the first adjacent node and a transmission utilization rate and an influx utilization rate of the second link are substantially zero, and
   the determining determines that there is a high probability that packets are transmitted to the first adjacent node when the transmission utilization rate of the first link exceeds a second threshold which is equal to or less than the first threshold, and determines that there is a low probability that packets are transmitted to the first adjacent node when the transmission utilization rate of the first link is less than the second threshold.

8. The method according to claim 7, said process further comprising
   transmitting an "Awake" instruction to the first adjacent node to return the first adjacent node from a sleep mode when it is determined that there is a high probability that packets are transmitted to the first adjacent node and the first adjacent node is in a sleep mode.

9. The method according to claim 7, said process further comprising
   when it is determined that there is a high probability that packets are transmitted to the first adjacent node, transmitting a packet transmission advance-notice message to a node which is a next hop of the second route.

* * * * *